Feb. 4, 1964 P. W. THIEDE 3,120,181
CIRCUMFERENTIAL REGISTRATION CONTROL
Filed Nov. 3, 1960 7 Sheets-Sheet 2

INVENTOR.
Paul W. Thiede
BY
Silverman, Mullin & Cass
ATTYS.

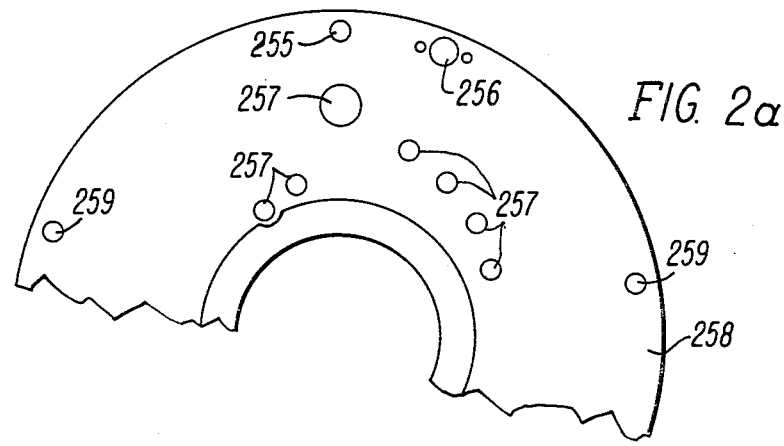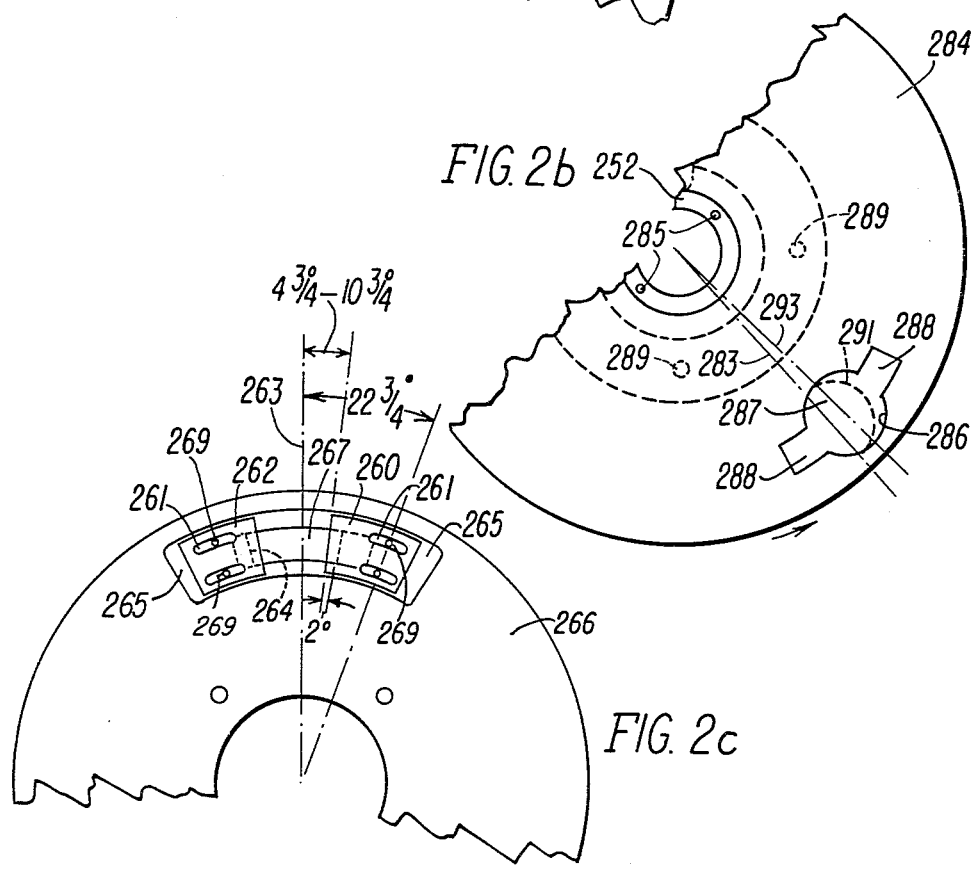

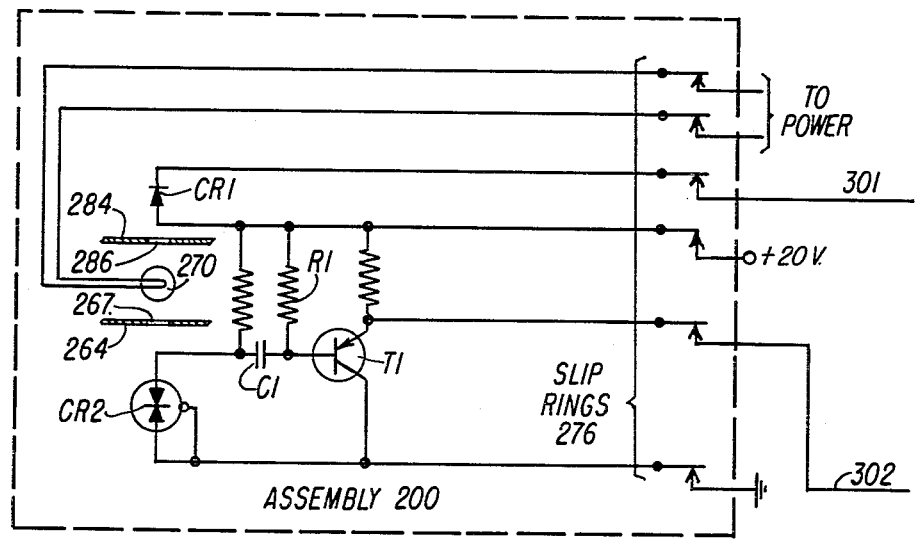
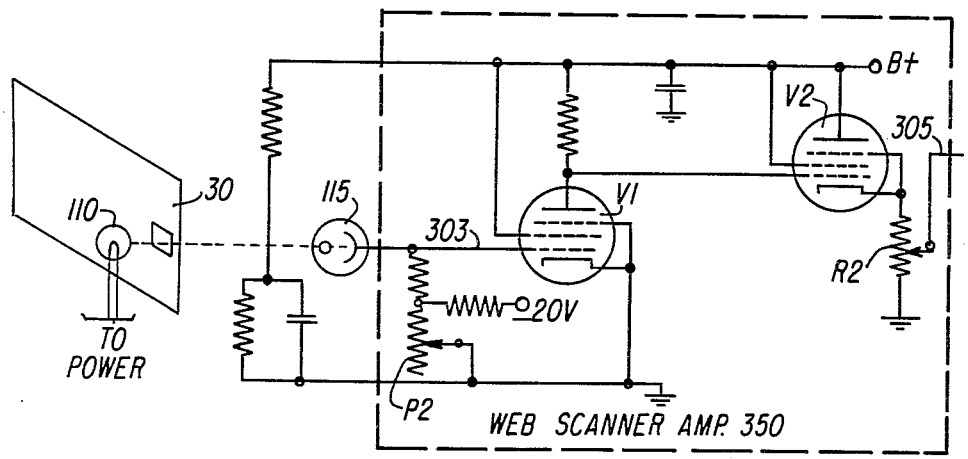
FIG. 3

INVENTOR.
Paul W. Thiede

INVENTOR.
Paul W. Thiede
BY
Silverman, Mullin + Cox
ATTYS.

United States Patent Office 3,120,181
Patented Feb. 4, 1964

3,120,181
CIRCUMFERENTIAL REGISTRATION CONTROL
Paul W. Thiede, Danville, Ill., assignor to Hurletron Incorporated, Danville, Ill., a corporation of Delaware
Filed Nov. 3, 1960, Ser. No. 76,988
47 Claims. (Cl. 101—181)

This invention relates in general to a synchronizing system and more particularly to a synchronizing system in which the departure of a moving web from a predetermined standard is dimensionally ascertained.

Synchronization or registration systems have a great many applications especially in automated processes wherein two components moving relative to one another must be related so that a function performed by one occurs with respect to a particular position of the other. Such systems require precise control and knowledge of the relationship between the components or parts and to this end often have incorporated an arrangement in which registered positions or marks individual to the parts are detected and the phase relationship between the marks used for adjusting the position of either component relative to the other.

To correct the position of either component, however, by means of a signal related to the phase relationship necessitates information as to the speed or velocity of movement of the components in order to determine the correct point at which the components will be synchronized. This in turn also necessitates information for correlating the response or acceleration of the adjustment apparatus and the components, when the adjustments or changes are being made. As may be envisioned, the complex problems arising from this situation are difficult to resolve in an economical manner, and therefore synchronization systems as a rule on determining the existence of a phase difference between the several parts do not make a single accurate adjustment, but a continuous series of adjustments. The continuous adjustments result from the adjustment apparatus and the components being operated or driven to a particular position related to the phase difference between the marks without reference to the factors mentioned above so that over-adjustments result, which in turn must be eliminated by succeeding adjustments.

In the present arrangement a simple but novel expedient for solving these problems has been devised. This arrangement rests on the principle of ascertaining the physical or spatial displacement of one component with respect to another instead of the time or phase difference therebetween. Misalignment is therefore measured with reference to a fixed position or mark on one of the components and the adjustment is made in an increment related to the specific misalignment. Thus, as applied to a synchronization system for use in a print line, for example, the present invention utilizes a point having a predetermined position with respect to the print cylinder or roller engaged by the moving web and measures the displacement of the web with respect to that point in terms of a dimensional or spatial displacement thereby immediately eliminating the need for compromise adjustments.

To accomplish this primary objective, however, it has been necessary to devise an arrangement which automatically locates the predetermined point with respect to the print cylinder and compares it with a signal derived from a mark indicating the position of the web. This is done by deriving a signal which has a characteristic that is substantially linearly related to the movement of the print cylinder. During the occurrence of this linear signal, respective signals are derived from the mark on the web, and from a predetermined point with respect to the cylinder so that the positions of those signals bear a spatial relationship to the distance traversed by the cylinder from the initiation of the linear signal. If the cylinder position signal and web mark signal coincide with respect to the linear signal, the web and print cylinder are in synchronization whereas if the two should not coincide an error signal is derived related to the dimensional difference between the position of the print cylinder and web. This error signal may vary in either of two directions depending on whether the cylinder or web signal precedes the other. The amplitude of the error signal is directly related to the distance between the two signals as measured by the intercepted segment of the linear signal and this segment corresponds to the spatial or dimensional alignment of the web and cylinder.

With this arrangement it is possible to simplify the electrical circuitry considerably by providing mechanical apparatus which positions the linear and cylinder signal producing elements in a desired relationship to each other and since they are controlled from the same drive apparatus their relationship remains constant. It will be realized of course that in principle the web signal instead may be givein the desired relationship to the linear signal, but as a practical matter this would introduce unnecessary complications in the system.

It will be immediately appreciated that the mechanical construction may comprise any arrangement which translates the rotational movement of the print cylinder into a linear signal. To do this in the present case a photocell is exposed to a linearly increasing light value at a desired position during the rotation of the print cylinder. The rate at which the light falls on the cell may vary with the speed of the cylinder as the mask which exposes the cell is rotated with the cylinder. The slope of the signal derived from the cell may therefore vary in accordance with the speed of rotation, but its rate of change will remain linear irrespective of press or print cylinder speed.

By mounting another cell and mask in a predetermined position with respect to the first cell and mask and rotating the second mask with the print cylinder a second or cylinder signal is derived which occurs after the cylinder has rotated a predetermined number of degrees from the initiation of the linear signal. Now actually any particular point may be chosen on the first linear signal to accomplish the same purpose, however, certain adjustment may more easily be performed by utilizing separate cells.

The signal representing the web position may be derived in any conventional manner such as by a web registration mark intercepting light between a lamp and photocell arranged along the web path.

The linear signal hereinafter generally referred to as the inspection zone signal is utilized to set respective electrical circuit apparatus to which the cylinder web signals are applied into a particular condition so that the functions of that circuit apparatus proceed from the same condition under control of the linear signal. The subsequent occurrence of the cylinder signal hereinafter generally referred to as the cylinder pulse and the web signal hereinafter generally referred to as the web pulse thereafter control the respective circuit apparatus so that the status thereof corresponds to the spatial or dimensional position of the web and cylinder.

A signal corresponding to the status of the circuit apparatus is applied to a differential amplifier. If the status of one is different from that of the other, the amplifier functions in accordance with the difference to operate the conventional compensating apparatus. The degree to which the compensating apparataus is operated is therefore directly related to the misalignment between the cylinder and web signals and the compensating apparatus is therefore operated to a corresponding position without regard to the phase relationship of the cylinder and web signals.

With the described arrangement a number of other advantages are achieved. Thus, any point on the cylinder may easily be selected as a reference point by positioning either the photocells or the masks with reference thereto. Adjustments between the positioning of the cylinder and inspection zone signals readily may be made by changing the locations of the respective masks or cells one with respect to the other. The circuits may be adjusted to provide electrical signals simulating a change in either web or print cylinder locations whereby a change in the relative positions of the web or print cylinder is accomplished by adjusting the circuit to control the compensating apparatus. Likewise the response of the compensating apparatus may be governed by a minor circuit adjustment of the amplifier and in addition malfunctioning of the apparatus through the failure of a signal to appear within desired spatial limits is easily detected. The arrangement further permits a change in the type of web or the marking thereon to be compensated for by a simple circuit adjustment so that signals of a required character can be derived without changing the web scanner.

It is therefore an object of this invention to provide both an improved and economical synchronizing system or apparatus.

It is another object of this invention to provide an arrangement or method for providing a signal related to the dimensional misalignment of two moving parts to be synchronized.

It is another object of this invention to provide adjustably positioned apparatus in a synchronizing system for deriving signals related to the dimensional relationship between the components.

It is still another object of this invention to secure a signal which varies linearly with the displacement of certain moving apparatus whereby the dimensional relationship between various moving components easily may be ascertained.

It is still another object of the present invention to provide electrical means for simulating the displacement of various components in a synchronizing system.

Yet another object of this invention is to provide an electrical arrangement in a synchronizing system for controlling the rate of response of certain adjustment apparatus to a condition of misalignment.

It is still a further object of this invention to provide a versatile synchronization system which is operable to provide adjustment for widely varying types of components by means of simple electrical circuit adjustments.

It is also an object of this invention to provide apparatus in a synchronizing system for detecting the failure of certain signals to appear within certain predetermined limits.

With the forgoing and other objects in view which will appear as the description proceeds, the invention consists of certain novel features of construction, arrangement and a combination of parts and circuits hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawing in which the same characters of reference are employed to indicate corresponding or similar parts throughout the several figures of the drawings:

FIGS. 2, 2a, 2b and 2c are illustrations of the various mechanical apparatus used in positioning the photocells and masks.

FIGS. 3, 4 and 5 illustrate the circuit details of the electrical apparatus illustrated in FIG. 1 and should be arranged in order from left to right.

Figure 8:
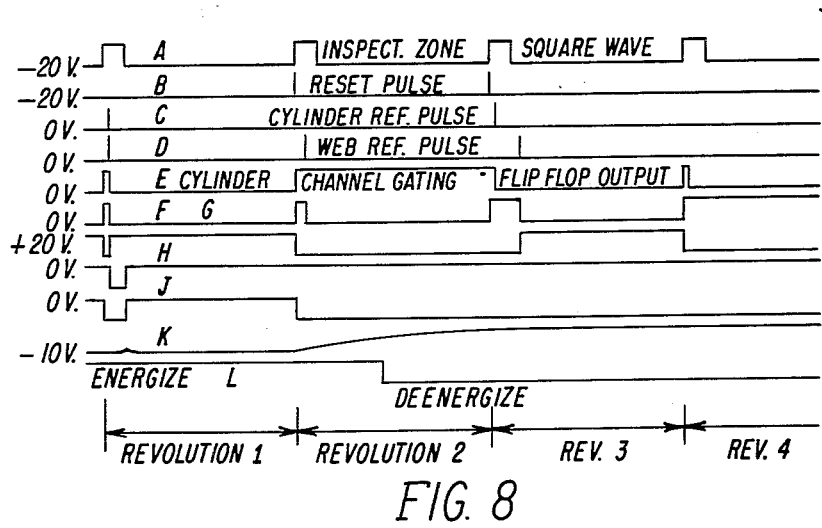
Figure 7:
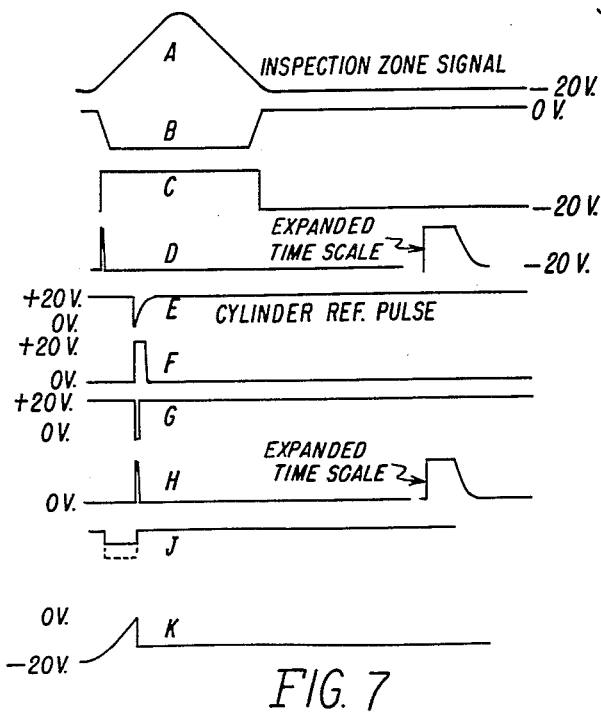

FIGS. 6, 7 and 8 display various waveforms or graphs illustrating respective electrical conditions resulting from the operation of the synchronizing system.

Figure 1:
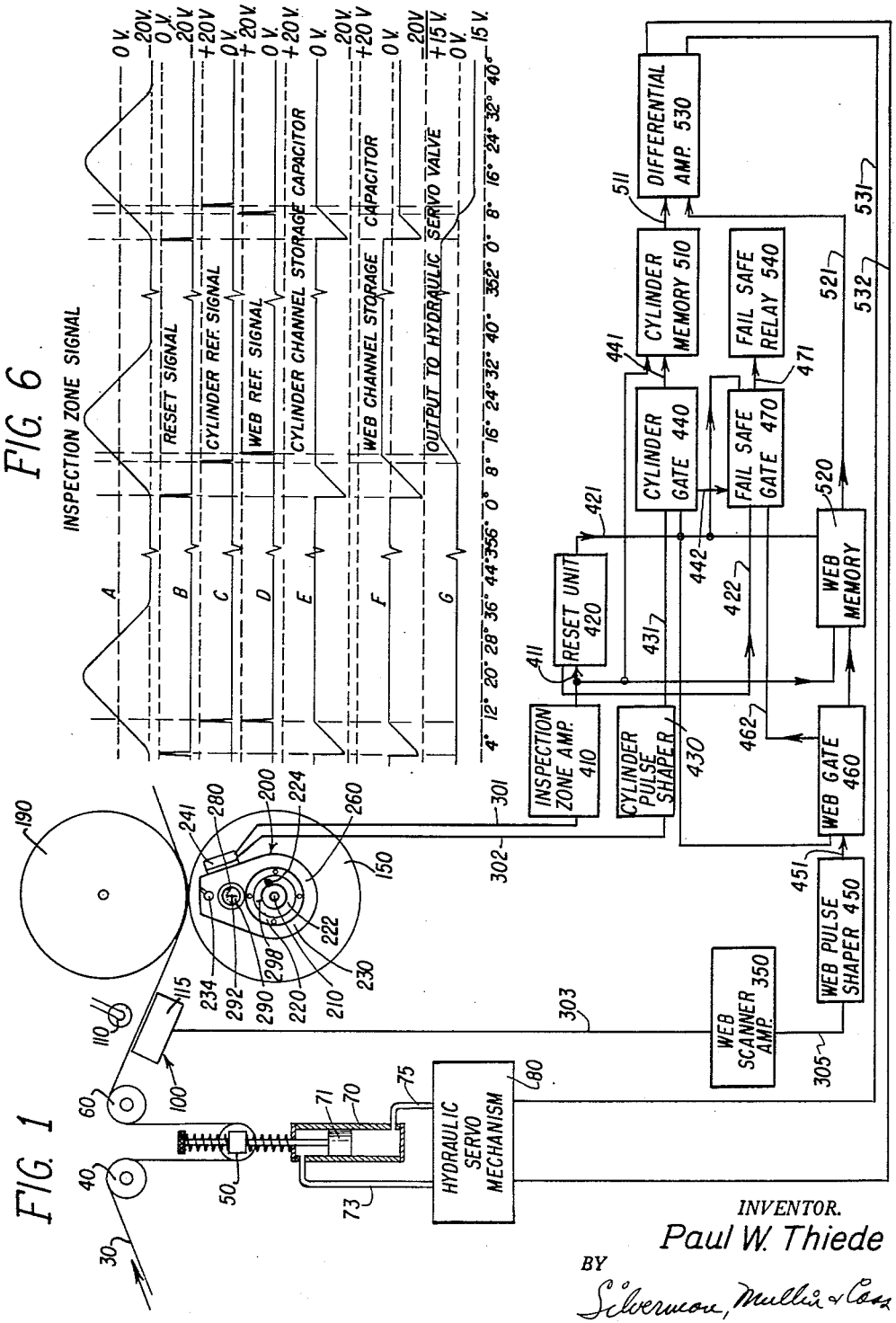
FIG. 1 is largely a block diagram of the various electrical components used in the present invention together with a schematic illustration of a portion of a print line.

Referring now to FIG. 1 the invention will be generally described by reference to the block diagram and the schematic of a portion of a print line or high speed press comprising a print cylinder to which a web is passed for the purpose of enabling the cylinder to apply printed impressions or indicia to the web.

The print line may actually comprise a number of such print cylinders each applying in succession an impression to the web. These impressions are made at very high speed and are often made in differently colored inks to create a desired representation. The inks must be placed within thousandths of an inch of certain prescribed areas in order to avoid visual distortion of the resultant impressions. After the required impressions are made the web is usually passed to certain cutting and folding apparatus which also operating at high speed must perform respective functions on the web bearing a predetermined relationship to the printed impressions. As may be understood the apparatus used in the print line is subjected to large stresses and is therefore composed of elements of considerable size and weight, but must also be capable of delicate adjustments and accurate positioning in order to secure the desired results in the finished product. Since the relationship of the web to the print cylinders is subjected to numerous changes resulting from variations in such factors as ambient temperature and humidity, sensing apparatus must also be provided for determining changes in the relationship and the components of the print line automatically adjusted and positioned to compensate for those changes in order to retain the quality of the finished product.

In FIG. 1 it will be seen that a web indicated by the reference character 30 is moving in a direction indicated by the arrow. It passes over a series of guide rollers 40 and 60 and engages a compensating or adjustment roller 50 located between the rollers 40 and 60.

The web bears a series of registration marks applied thereto in any well known manner for indicating the position in which printed indicia should be applied to the web. The marks are detected by an appropriate scanner element 115 when passed between the light source or lamp 110 and the scanner element 115. The web then passes between the print roller 150 and the roller 190 which serves to print additional indicia thereon in registration with the previously applied indicia. If the printed matter or indicia comprise various superimposed colors these must be printed in exact registration or a very adverse visual effect is created.

The compensating or adjustment roller 50 is of any well known type and is arranged to be moved or pivoted to adjust the position of the web 30. The roller 50 is under control of a hydraulic motor indicated at 70. The motor is of any well known type and may comprise a piston 71 which is arranged to be driven in either of two directions for adjusting the roller 50. The driving of the piston 71 is accomplished in any well known manner by means of the hydraulic servo mechanism indicated at 80. The mechanism 80 comprises a pair of solenoids indicated at 535 and 536 in FIG. 5. The solenoids 535 and 536 govern the fluid flow by means of a suitable valve arrangement through the conduits or pipes 73 and 75 into the motor 70 for moving the piston 71 all in a well known manner.

The scanner element 115 comprises a photocell shown in FIG. 3 and it is adapted to be controlled through a narrow slit by the light received from lamp 110. The light from the lamp 110 is suitably adjusted in accordance with the color and condition of the web and the mark and if desired is projected through a suitable optical system, not shown, onto the photocell 115. The photocell thus provides one type of output by way of lead 303 to the Web Scanner Amplifier 350 when one portion of the web 30 is passing adjacent thereto and another type of signal to the Amplifier 350 when a registered mark appears. The mark actually may be the edge of the print previously applied or a separate mark located at a particular position on the web. It may be either a dark area on a light web or a light area on a dark web, but in either event it provides a suitable change in the light falling on cell 115 so as to derive a web signal or pulse for transmission through lead 303 to the Amplifier 350.

The print cylinder 150 has a shaft 210 upon which is mounted the assembly 200 for generating the inspection zone signal and the cylinder pulse at appropriate intervals. This assembly 200 includes a pair of photocells CR1 and CR2 shown in FIG. 3 and a pair of masks 264 and 266 shown in FIG. 2. The masks 264 and 266 rotate with the shaft 210 and cylinder 150 to activate the photocells at predetermined angular positions of the print cylinder from the light source 270. Thus as the masks rotate they expose the photocells CR1 and CR2 during a predetermined portion of the cylinder revolution. As the exposure of cell CR2 occurs at a known position during the exposure of cell CR1 the respective output signals bear a predetermined relationship to each other. The cell CR1 generates a signal that rises at a substantially linear rate as a print cylinder 150 advances in its rotation while the other photo-cell CR2 provides a sharp pulse by way of lead 302 at a predetermined point in the cylinder rotation. There is thus derived an inspection zone signal transmitted through lead 301, which rises at a linear rate and falls at a linear rate as the light is increased and then decreased to photo cell CR1 and this signal is passed through an inspection zone amplifier indicated at 410. During the rising portion of the inspection zone signal the short cylinder reference pulse is transmitted by way of lead 302 in response to the exposure of photocell CR2 and that pulse is passed to the Cylinder Pulse Shaper 430.

The inspection zone signal is amplified by Amplifier 410 and transmitted by way of lead 411 to the Reset Unit 420, the Cylinder Memory 510 and the Web Memory 520. The latter two circuits are of similar design and each is controlled by the linear pulse on lead 411 as will be explained. The Reset 420 shapes the incoming signal on 411 to provide a desired output on lead 422 to the Fail Safe Gate 470 and a short positive reset pulse or signal on lead 421 as shown in waveform B in FIG. 6. The Fail Safe Gate 470 and the Fail Safe Relay 540 are in reality alarm circuits which respond to the failure of signals to be received in proper sequence to indicate this condition and to place printing operation under manual control for ease in discovering a fault condition in any well known manner.

The reset signal applied by way of lead 421 is applied to the Cylinder Gate 440 and the Web Gate 460 to enable those circuits to respond to the respective web and cylinder signals or pulses. The reset signal on lead 421 is also applied to the Web and Cylinder Memories 520 and 510 respectively for the purpose of setting respective capacitor C53 and C47 shown in FIG. 5 to a predetermined charge value. Thereafter these capacitors start to charge at the same linear rate governed by the inspection zone signal on lead 411 as shown in waveforms E and F respectively in FIG. 6. The cylinder pulse subsequently appearing on lead 302 is shaped by the Shaper 430 and applied by way of lead 431 to the Cylinder Gate 440, which has been previously prepared by the pulse on lead 421. The cylinder pulse is shown in waveform C in FIG. 6 and after application to Gate 440 it is applied by way of lead 441 to the Cylinder Memory 510 to terminate discharge of capacitor C47. Simultaneously the Gate 440 applies an output to the Fail Safe Gate 470 through lead 442 to signal that Gate of the arrival of the cylinder pulse.

During this procedure the mark registered on the web 30 causes a web or scanner signal to be derived from the photocell 115. That signal is transmitted to the Amplifier 350 through lead 303 and from the Amplifier 350 to the Web Pulse Shaper 450 by way of lead 305. The Shaper 450 operates on the signal in a manner similar to Shaper 430 and Reset 420 to provide a similar output by way of lead 451 to the Web Gate 460. The Web pulse is shown by waveform D in FIG. 6 and it results in an output from the Gate 460 applied to leads 461 and 462. The output applied to lead 461 is transmitted to the Web Memory 525 to terminate further charge of the capacitor C53. The pulse on lead 462 is applied to Gate 470 to signal the Gate of the arrival of the web pulse.

As the change in the charge of the capacitors C47 and C53 from their initial charge value is governed by the linear inspection zone signal both will be charged to the same voltage value at any given point during the inspection zone signal irrespective of the print cylinder speed. Thus the speed at which the print cylinder is moving will govern the rate at which the inspection zone signal will change but for any given speed the rate will be substantially constant. Thus the same amplitudes of different inspection zone signals represents the particular spatial position on the cylinder irrespective of cylinder or web speed and if the web and cylinder pulses are properly related they will intersect the inspection zone signal at the same or desired portion of the inspection zone signal representing their spatial position.

The charges accumulated on the respective capacitors C47 and C53 are compared in the differential amplifier, being applied from the memories 510 and 520 to said differential amplifier 530 by way of the respective output leads 511 and 521. If a difference exists between the charges of these capacitors it will be proportional to the displacement or misalignment betwen the cylinder and web positions. The direction of misalignment will determine which of the capacitors has the greater charge.

Figure 5:
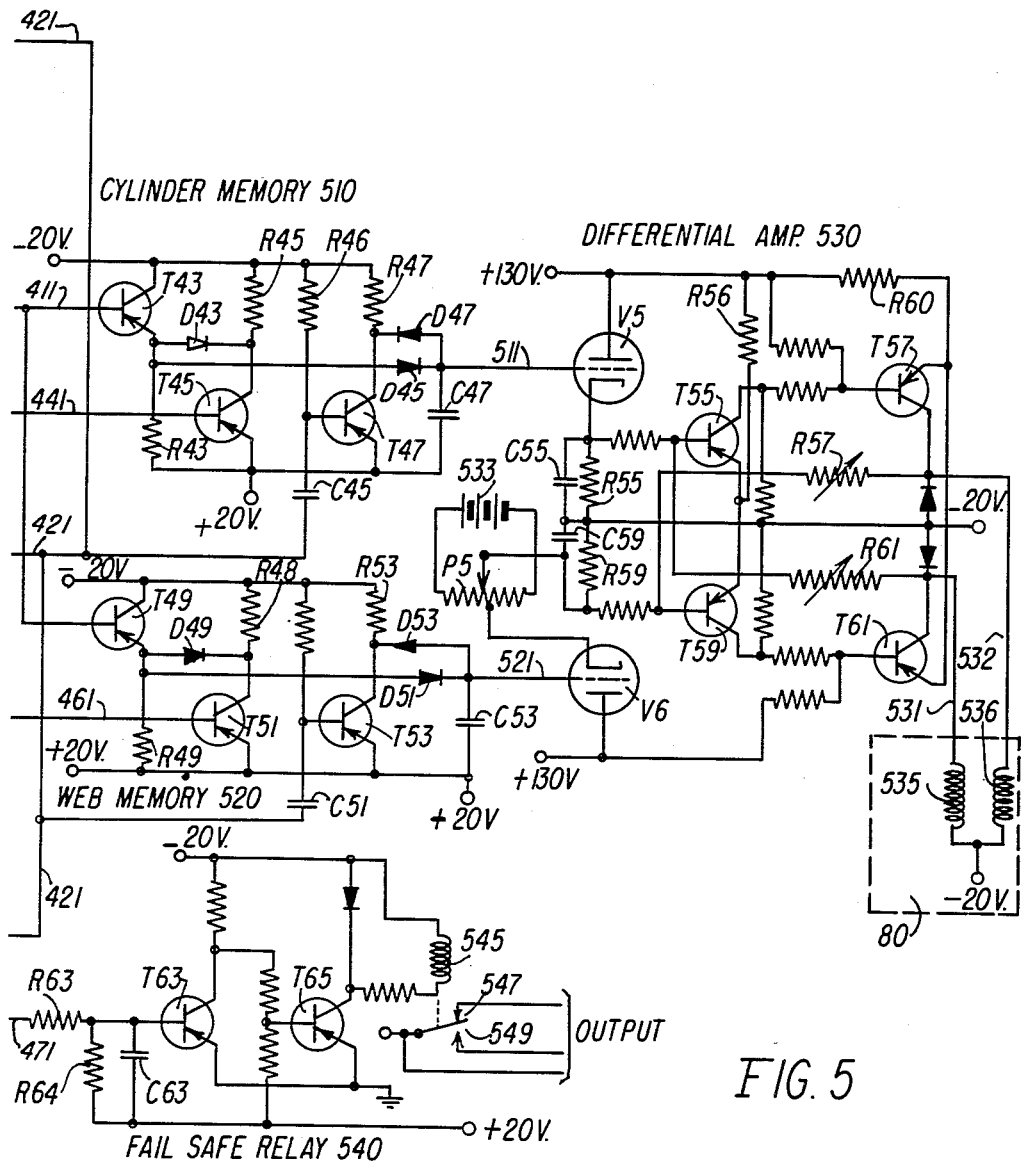

The Amplifier 530 amplifies the difference or error signal to energize the solenoids 535 and 536 shown in FIG. 5 in accordance with the direction of misalignment. Solenoids 535 and 536 in turn control the direction of fluid flow from the mechanism 80 through the conduits or pipes 73 and 75 to move the piston 71 and the compensating roller 50 in a well known manner for adjusting the position of the web 30 accordingly. The degree of movement is of course proportional to the amplitude of the error signal. Inasmuch as the Differential Amplifier 530 re sponds only to a difference in the charge of the two capacitors C47 and C53, and further, since that difference can occur only after one of either the web or cylinder signal has been received without receipt of the other, the Amplifier 530 will operate to adjust the position of roller 50 and the web 30 accordingly until the other signal is received to terminate the discharge of the other capacitor C47 or C53 whose charge is continuing. The web 30 therefore is adjusted in increments proportional to the displacement betwen it and the cylinder. When the other signal is received, charge of the respective capacitor C47 or C53 whose charge is continuing, is terminated and the output of the amplifier remains constant. Further charge in compensation does not occur until the next cycle of the cylinder as shown in waveform G in FIG. 6.

When the next inspection zone signal is received the charge on the capacitors C47 and C53 is reset to the same value. The Amplifier 530 returns to its original condition from which the displacement of the web and cylinder with respect to each other is gauged. Of course if no error signal is derived indicating that the web and cylinder are in alignment the output of the Amplifier 530 remains constant during the rotation of the cylinder through the inspection zone and the amplifier does not vary the adjustment in the position of the web with respect to the cylinder.

Before describing the circuit details by which the present invention accomplishes its purposes, the mask control assembly 200 will be explained. The general features of the assembly 200 may be seen in FIG. 1 and the various details of its construction are shown in FIGS. 2, 2a, 2b and 2c omitting certain mechanical construction details which would unnecessarily lengthen this description.

Thus in FIG. 1 it will be seen that the assembly 200 is mounted coaxially with the print cylinder shaft 210. Assembly 200 comprises a face plate 230 having a number of apertures therein. One of these apertures has a window 222 through which the pointer or indicator 224 may be seen. The indicator 224 is mounted coaxially with the shaft 210 and rotates therewith. An attendant visually may note the position of the indicator 224 through the window 222 and he may align the position of the photocell masks with the indicator 224 by means of the knurled knob or wheel 220 as will be explained.

Figure 2:
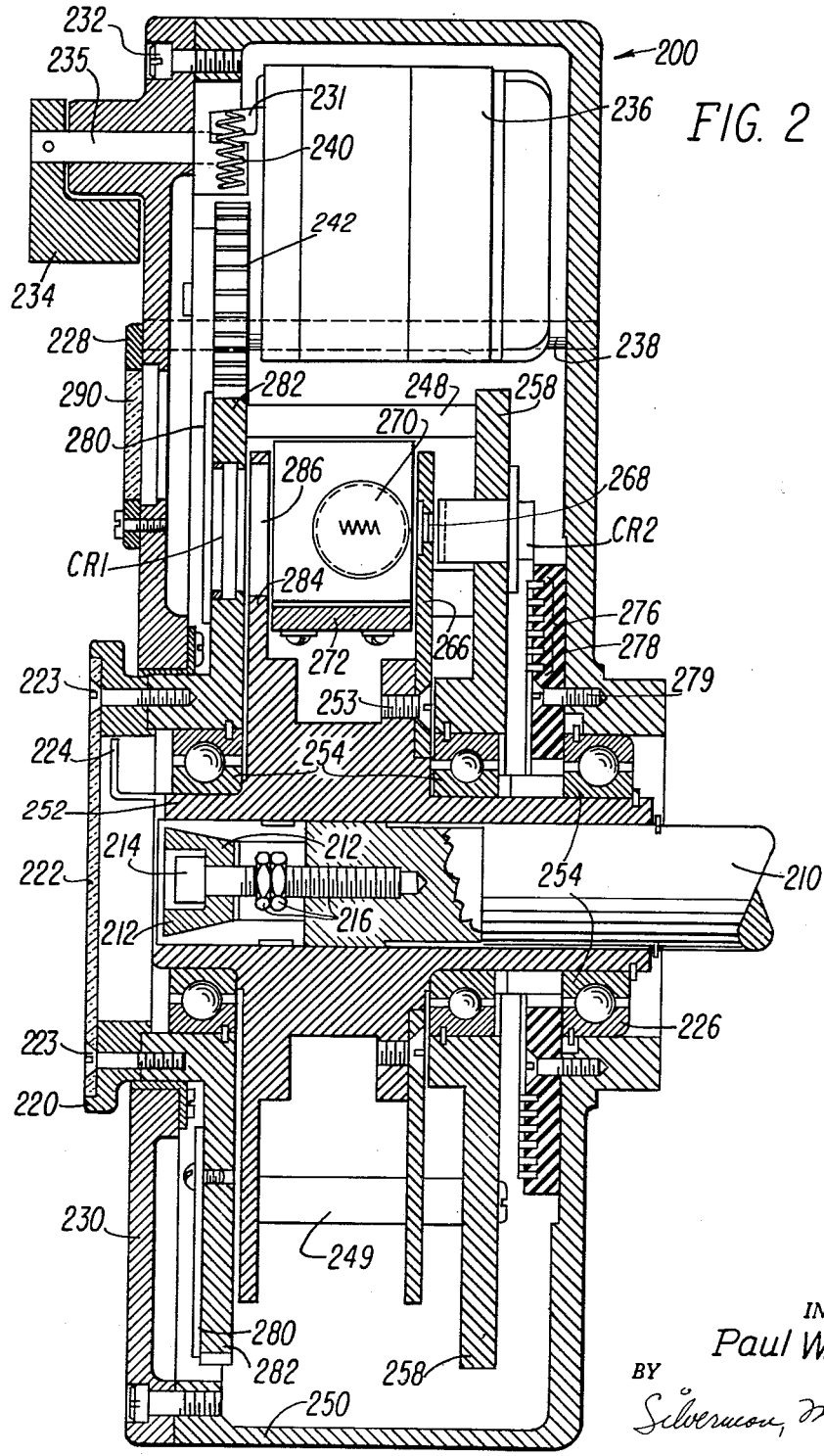

Directly above the knob 220 is a window 290 on which is a vertical marking or indicating line 292 and through which may be seen a dial 280 graduated in degrees for the purpose of ascertaining the particular setting of the masks with respect to the indicator 224, the print cylinder and its shaft 210. A knob 234 is mounted above the window 290 for controlling the positioning of a motor 236 within the assembly 200 as seen in FIG. 2. This motor 236 is adapted to rotate the photocell masks to any desired position. Also mounted on the assembly 200 is an electrical receptacle 241 through which various electrical connections are provided to the motor 226, lamp 270, for the photocells CR1 and CR2 and a transistor T1.

The arrangement of the various components within the assembly 200 is illustrated in FIG. 2. The assembly comprises a U or cup-shaped peripheral housing 250, considered in cross section, upon which the face plate 230 is mounted. The print cylinder shaft 210 or an extension thereof protrudes into the housing 250, which is supported on the shaft by means of the hub 252 and the bearings 254. The shaft 210 has a recessed portion at its end into which an expansion plug 212 comprising a conical section of soft metal is inserted and compacted by means of the bolt 214 for the purpose of forming a unitary rotatable assembly betwen the shaft 210 and the hub 252. Bolt 214 is threaded into the end of shaft 210 to provide the necessary coaction betwen shaft 210 and hub 252, while nut 216 is provided thereon to permit or to force the plug 212 out from the recess when it is desired to free the hub 252 from the shaft 210.

The indicator 224 is mounted on the left face of the hub 252 and rotates therewith. Its position may be ascertained through the window or glass 222, which in turn is mounted together with the knob 220 on the gear 282.

The hub 252 carries a pair of spaced apart vertical disc shaped masks comprising walls 284 and 266 and three spaced apart bearings 254. The wall 284 may be formed integrally with hub 252, while wall 266 is mounted on hub 252 by means of screws such as 253. This arrangement is provided primarily for ease in assembling the various components. One bearing race 254 carries the gear 282 and another carries the rear side plate 258. The third bearing or race carries or engages the hub portion of the housing element 250. Thus, the shaft 210 together with the hub 252 and the masks 284 and 266 are rotated as a unit with the shaft 210 and the print cylinder while the gear 282, plate 258 and the housing assembly 250 remain stationary during normal operation. The gear 282 may be independently rotated by knob 220 or the motor 236 and since the gear 282 is connected to the side plate 258 by means of bolts inserted in spacers such as 249, and which are placed beyond the radial dimension of masks 284 and 266, the side plate 258 is simultaneously rotated therewith.

A slip ring carrier 278 is carried on the inner vertical wall of housing 250. Ring carrier 278 is an insulating block having a plurality of separate conductive slip rings indicated at 276 for extending electrical circuits from the connector 242 to various electrical components in the assembly 200 through commutator brushes carried by the plate 258.

A front view of a portion of the side plate 258 is shown in FIG. 2a. A series of spaced apart apertures 257 are provided, each lying at a differing radial distance from the center of plate 258. Each of these apertures receives a commutator brush in any well known manner for connecting a circuit component to a respective one of the slip rings 276. In addition there is shown an aperture 257 for carrying the cylinder reference signal photocell CR2 a specified radial distance from the center of shaft 210; an aperture 256 into which the transistor T1 is mounted and the apertures 259 arranged to receive the bolts with the spacers 249 thereon between the side plate 258 and the gear 282. The apertures 259 are aligned with similar apertures in the gear 282 so that the center of photocell CR2 is aligned with the center of the inspection zone photocell CR1 carried by the gear 282. The mounting for photocell CR2 in aperture 257 is arranged so that only a very narrow slot in the vicinity of .004–.006″ may be exposed to light from lamp 270. Aperture 255 is provided for the purpose of retaining a conduit 248 into which wires are placed for extending electrical connections to the lamp 270 and to the photocell CR1 carried by gear 282.

The lamp 270 provides the light for activating the respective photocells CR1 and CR2, and it is carried between the two masks or walls 284 and 266. As the light is intended to activate the photocells only when suitable apertures (to be described) in walls 284 and 266 are in alignment with the respective photocells CR2 and CR1, the desirable arrangement for the lamp is to suspend it from one or more of the spacers 249 or conduit 248 by means of the bracket 272, while extending electrical connections thereto from wires carried in tube 248. The lamp 270 is therefore stationary with respect to gears 282 and plate 258 and aligned with the respective photocells by suitable adjustment of bracket 272; however, the light therefrom is insufficient to activate the photocells until the respective aperture in gear 282 and plate 266 are aligned with the respective photocells CR1 and CR2.

The gear 282 is similar to the side plate 258 with the exception that it is provided with gear teeth along its periphery for engaging the gear 242 driven by the motor 236. In addition, gear 282 carries the dial 280, which is observed through the window 290 and the window is in turn retained in position on face plate 230 by the ring 228. The gear 282 carries the inspection zone photocell CR1 at substantially the same radial distance from the center of shaft 210 as the photocell CR2 and the exposure of cell CR2 is controlled by the mask 284.

The mask or wall 284 may probably best be seen by reference to FIG. 2b. It has the aperture 286 therein spaced an appropriate radial distance from the center of the shaft 210 to bring it into alignment with the photocell CR1 mounted in gear 282. The threaded apertures 285 are provided in the hub portion 252 for the purpose of mounting the indicator 224 thereon in alignment with the center of aperture 286, while the threaded apertures 289 are provided for the purpose of mounting the mask or wall 266 on the other end of hub 252.

It will be noted that the aperture 286 comprises a generally circular portion 287 which terminates in forwardly and rearwardly extending slots 288 parallel to the periphery of wall 284. These slots extend in an arc terminating at about 18½ degrees on each side of a radial line from the center of shaft 210 to the center of aperture 286. The diameter of the circular portion 287 is substantially identical to the diameter of the face of photocell CR1 to be exposed so that when the center of aperture 287 is aligned with the center of photocell CR1 substantially maximum exposure is achieved. That aligned position provides the maximum amplitude of the inspection zone signal whereafter the signal decreases; however, the desired portion of the inspection zone signal occupies only about 10% of arc from the initiation of the inspection zone signal and it is during this portion that the cylinder and web pulses are generated. The linear rise time of the inspection zone signal must therefore occur for some distance before the center of aperture 287 coincides with the center of the photocell CR1. Thus with the arc of the circle defining the photocell CR1 indicated by the dotted line 291 the area of exposure of the photocell CR1 will rise at a substantially linear rate from approximately 10° of arc preceding the dotted radial line indicated at 283. The area of exposure rises to a maximum value when the center of the circle partially indicated by dotted line 291 coincides with radial line 293, extending through the center of aperture 286. Thus the angular distance between line 283 and the radial line 293 from the center of aperture 287 to the center of the shaft occupies about 10° of arc and reflects the desired position in which cell CR2 is exposed to provide the cylinder pulse. It will be understood of course that any geometrical arrangement which provides a linear rise in the signal from the photocell CR1 may be used instead of the one described herein and that the circuit connected to cell CR1 also may be arranged to improve the linear characteristics of the signal.

With the inspection zone signal beginning to rise linearly, about 10° to the left of line 283, assuming that plate 234 is moving clockwise, the mask 266 exposes photocell CR2 when it is in alignment with line 283 so that the cylinder reference pulse occurs midway in the linear rise of the inspection zone signal. Likewise if the mask 284 is travelling in a counter-clockwise direction, the exposure of photocell CR2 should occur in alignment with a line corresponding to 283 that lies to the right of line 293.

The mask or wall 266 carries a pair of adjustment masks 260 and 262. One edge of either adjustment mask 260 or 262 is arranged to be aligned either with line 283 or a corresponding line on the other side of radial line 293 depending on the desired direction of rotation to control the exposure of the cylinder reference cell CR2. The masks 260 and 262 are shown mounted on wall 266 in FIG. 2c. The wall or mask 266 is mounted on the hub 252 as shown in FIG. 2 and is interposed between the lamp 270 and photocell CR2 so that cell CR2 is not exposed to light until the trailing edge of either mask 260 or 262 exposes the leading edge of slot 267.

Although the form of the slot 267 is subject to considerable variation, as illustrated, it terminates on opposite sides in the recesses 265 formed in the wall of the plate 266. The masks 260 and 262 are fitted in the recesses 265 so that they are flush with the wall 266 and cover portions of the slot 267 depending on the adjustment thereof. To provide the adjustment, slots 261 are placed in each adjustment mask 260 and 262 so that they may each be moved with respect to the aperture 269 in the recesses 265 and fastened at the adjusted position.

It will be noted that two such masks are provided. The provision of two masks which may each cover a desired portion of the aperture 267 permits the cylinder reference pulse to be generated without regard to the direction of rotation of the cylinder. Thus if the cylinder is rotating in one direction, mask 260 first exposes the photocell CR2 whereas if the print cylinder is rotating in the other direction, mask 262 will first expose the photocell CR2, and as only the leading edge of the cylinder reference pulse is used, only the initial exposure on either side is of consequence.

The adjustment masks 260 and 262 each subtend an arc of about 20° and the slots 261 therein occupy about 6° beginning at 2° before the mask end. As the screw holes 269 in recess 265 are each at about 22¾° from the center of slot 267, each mask can be adjusted to leave exposed a portion of slot 267 having an arc between 4¾° to 10¾° from the radial line 263 extending through the center of slot 267. The bosses 264 at the end of masks 260 and 262, cover an arc about 2° from the end of the respective adjustment mask and serve to maintain the alignment of the masks in the slot 267. With mask 260, for example, adjusted to about 8½° to the right of line 263, the exposure of cell CR1 by aperture 286 will occur about 10° before this, as the slot 288 initiates exposure of cell CR1 about 18½° to one side of the aligned centers of slot 267 and aperture 286. At this point it will be noted that the exact position in which cell CR2 is exposed with respect to cell CR1 is not so important as that it occur at fixed position with respect to the linearly rising signal provided by the exposure of cell CR1.

The motor 236 is a slow cycling motor providing about 1 r.p.m. and is adapted to be energized as desired usually from a remote position for moving the gear 242. Normally the motor is biased in one direction about pivot 238 by spring 240 which engages between bracket 231 and the housing 250. This bias maintains gear 242 in engagement with gear 282. Energization of the motor 236 causes rotation of the gear 282 carrying the photocell CR1 and the side plate 258 carrying the photocell CR2 together with the lamp 270. Electrical connections to the respective elements are maintained through the slip ring conductors 276 on the ring carrier 278. The effect of this rotation is to bring the photocells CR1 and CR2 at a desired angular position with respect to the respective openings 286 and 267 without moving the print cylinder.

The motor 236 and its gear 242 may be rotated out of engagement with gear 282 by manual operation of the knob 234. Operation of the knob 234 rotates the shaft 235 for rotating the motor 236 about pivot 238 against the tension of spring 240. On release of this knob, of course, the motor and gear 242 return to a position of engagement with the gear 282. This procedure permits gear 282 and side plate 258 to be moved to a desired position by operation of knob 220 without the drag of motor 236.

The general procedure for setting up the press or print line includes the steps of inching the press while the printed impressions are observed by the attendant. He manually adjusts the compensator 50 until the printed impressions are in registration or properly positioned, and then stops the press. He now notes the position of the indicator 224. That indicator has a fixed position with respect to a point on print cylinder and is aligned with the center of the apertures 286 and 267. A mark or indicia 298 is then placed on the window 220 and this indicates the center of the mask apertures 287 and 267. The output from cell CR2 is now compared on an oscilloscope for example to note its position with respect to the output of cell CR1 and if adjustment is required the masks 260 and/or 262 are adjusted by means of the slots 261 and screws 269 until the signals are properly related. Thereafter the outputs of the cells CR1 and CR2 are brought into a particular relationship with the signal from the scanner 115 so that the outputs of cell CR2 and scanner 115 have the same relationship to the inspection zone signal. This may be done manually by operating the knob 220 while motor 236 is disengaged from gear 282. The motor 236 is disengaged from gear 282 on operation of knob 234. This shifts both the inspection zone signal from CR1 and the cylinder reference pulse from CR2 with respect to scanner 115. When they are properly related as observed on the scope, movement of knob 220 may be terminated and knob 234 restored. If the adjustment is made from some remote location, motor 236 is energized to rotate the photocells CR1 and CR2 to accomplish the same type of adjustment. This procedure is followed before the outputs of the cells CR1 and CR2 are connected to control the compensator 50 and while the print is in registration for obvious reasons. The apparatus is now prepared automatically to maintain the print in registration.

In the event it is desired to adjust the position of the inspection zone signal with respect to the set up position or into a particular relationship with a printed impression the amount of adjustment may be gauged by dial 280. Knob 234 is manually operated to bring the motor 236 and its gear 242 out of engagement with gear 282, and then the knob 220 is operated to rotate the gear 282 and side plate 258 together with the respective photo-cells CR1 and CR2. The degree of rotation is noted by observing the angular marks on dial 280 with respect to the mark 292. This changes the position of the photo-cells CR1 and CR2 with respect to the pointer 224 and masks 266 and 284 by a desired or predetermined amount so that the inspection zone and cylinder signals may be generated at a desired position with respect to the print cylinder and/or the scanner output from cell 115. The knob 234 is then released to bring gear 242 back into engagement with gear 282. Alternatively of course the motor 236 can be energized and it will rotate the gear 282 and slide plate 258 together with the photocells to a desired position while the output of the cells is observed against the scanner signal, for example, to bring the signals into a proper degree of registration from some remote position. These positioning arrangements are provided primarily for flexibility in adapting the apparatus to various working conditions.

*Circuit Details*

Figure 4:
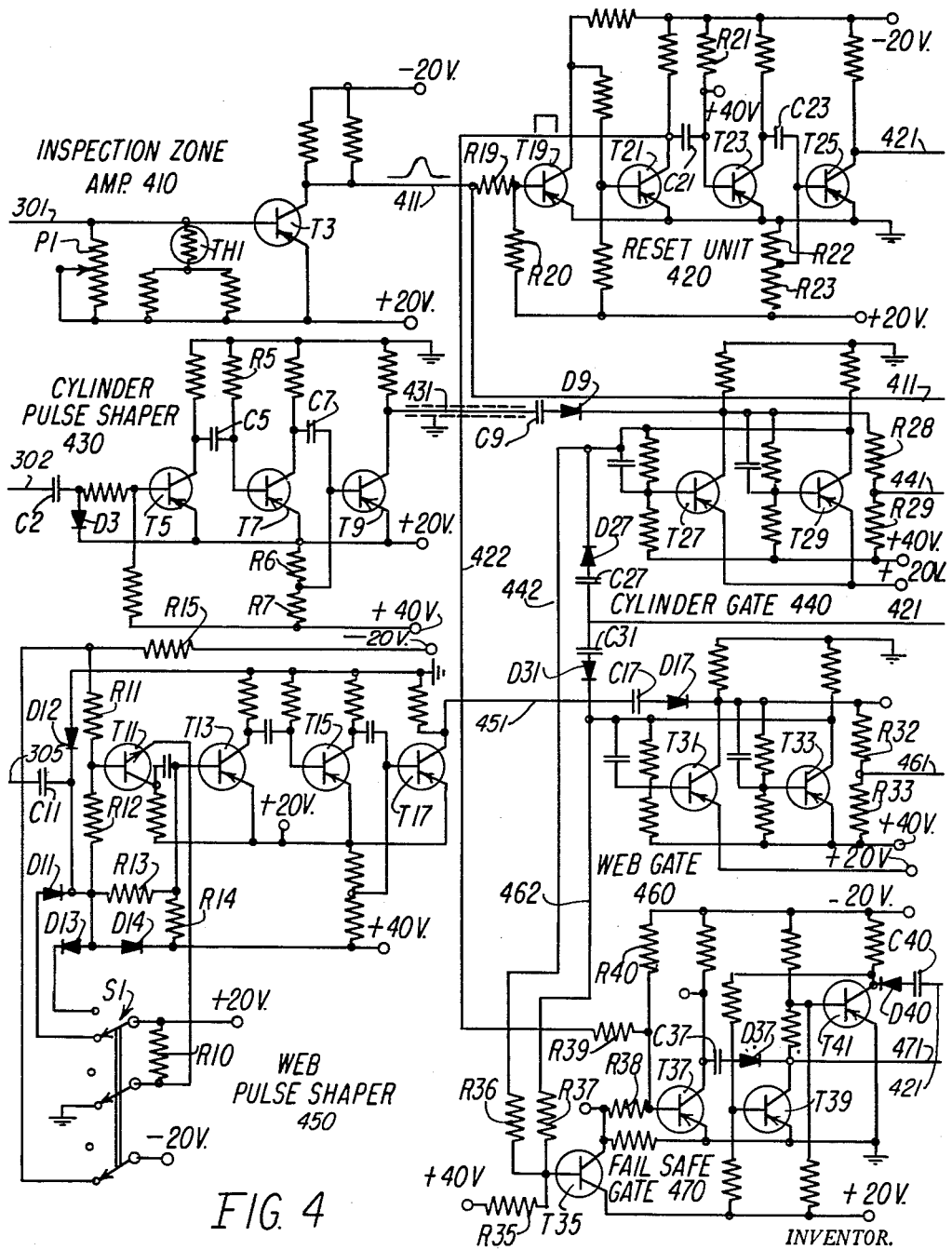

Proceeding now with the detailed circuit operation, reference will be made to FIGS. 3–5 wherein the circuit details together with the various voltages used are indicated and to FIGS. 6–8 wherein graphs of certain phases of the electrical conditions are illustrated.

It will be understood that the print cylinder 150 and the roll 190 are rotating to register indicia on the web 30 either during production or for test purposes as the web moves over the periphery of the print cylinder 150. During rotation of the print cylinder shaft 210, masks 284 and 266 expose the respective photocells CR1 and CR2 to light from lamp 270, as diagrammatically illustrated in FIG. 3. First the photocell CR1, which has a photovoltaic characteristic, is exposed to light radiation from the lamp 270 to generate the inspection zone signal.

As the exposed area of the photocell CR1 increases, the inspection zone signal rises as the current through CR1 increases. This results in the transmission of a signal by way of lead 301 to the base circuit of transistor T3 in the Inspection Zone Amplifier 410. Transistor T3 amplifies this current so that it is largely linear as shown by the waveform A in FIGS. 6 and 7. Thus as the current by way of lead 301 increases, the collector circuit of T3 swings from −20 volts towards approximately +20 v. The potentiometer P1, of course is adjusted to bypass a certain portion of the input current to prevent T3 from operating to saturation. With the voltages shown and P1 properly adjusted, the collector circuit of T3 will range to a peak of about +18 volts at the time cell CR1 is fully exposed with no flattening of the peak. The thermistor TH1 and associated resistors are provided to compensate for variations in the operation of T3 with changes in ambient temperature.

The signal at the collector circuit of transistor T3 is applied through lead 411 to the base circuit of transistor T19 in the Reset 420; to the base circuit of transistor T43 in the Cylinder Memory 510, and to the base circuit of transistor T49 in the Web Memory 520. It will be noted that the inspection zone signal as originally derived may not be perfectly linear throughout, however this is of only theoretical consequence as the circuit constants of the various components contribute to its linearity. In addition, the scanner and cylinder reference pulses are measured against the central portion of the inspection zone signal, which is practically linear.

Transistor T19 in the Reset 420 is normally conducting heavily, but as soon as the positive going signal that appears on lead 411 has risen several volts, transistor T19 swings to cutoff. Resistors R19 and R20 serve to set the bias on the base circuit of T19 a desired level. The negative going portion of the trapezoidal wave shape shown by waveform B in FIG. 7 represents that swing to cut off, whereafter the collector of T3 remains negative until the inspection zone signal falls below a predetermined value and T19 again conducts. The negative signal is applied to transistor T21 which conducts immediately to provide the positive going portion of the square wave shown at C in FIG. 7 and A in FIG. 8. This positive signal is applied to the differentiating network comprising capacitor C21 and resistor R21. The positive signal at the collector circuit of T21 is also transmitted by way of lead 422 to the gate resistor R39 connected to the base circuit of transistor T37 in the Fail Safe Gate 470 for a purpose to be explained. The differentiated positive pulse from the collector of T21 is applied at the base circuit of transistor T23. Transistor T23, therefore, cuts off and its collector circuit swings negative to provide a pulse whose characteristic is determined by the value of capacitor C23 and resistors R22 and R23. Transistor T25, therefore, conducts in response to the negative pulse to supply a short positive going pulse through lead 421 from its collector circuit as seen in waveform B in FIG. 6, waveform D in FIG. 7 and waveform B in FIG. 8. This is the reset pulse and its rise time, amplitude and length are substantially independent of the shape, amplitude or repetition rate of the input signal.

The positive pulse on lead 421 is applied through capacitors C27, C31, C40, C45 and C51 to the Cylinder Gate 440, the Web Gate 460, the Fail Safe Gate 470, the Cylinder Memory 510 and the Web Memory 520 respectively. At the Cylinder, Web and Fail Safe Gates 440, 460 and 470 respectively, the positive pulse is extended through the respective rectifiers or diodes D27, D31 and D40 to the base circuits of transistors T27, T31 and T39 respectively, while at the Cylinder and Web memories the pulse is extended to the base circuit of transistors T47 and T53 respectively. Each of these transistors is therefore biased off. As transistors T27, T31 and T39 are arranged in a conventional flip-flop circuit with transistors T29, T33 and T41 respectively, transistors T29, T33 and T41 each conducts in response to the positive pulse on lead 421.

In the meantime it will be recalled that the pulse on lead 411 has been applied to the respective base circuits of transistors T43 and T49 in the Cylinder Memory 510 and Web memory 520 respectively. Both are normally conducting transistors connected as emitter followers. Their respective emitter circuits therefore follow the positive going signal on lead 411 and that signal in turn rises linearly to control the current flow or potential at the emitter circuits of these transistors accordingly.

Transistors T43 and T49 act as buffers, to prevent switching functions in the memories from affecting the input signals. Normally the emitter circuit of transistors T43 is at −20 volts to back bias the rectifiers D43 and D45, however as its emitter swings positive to follow the signal on lead 411 it will permit the condenser C47 to charge in a positive direction through the rectifier D45 and follow the signal on lead 411. Transistor T49 and rectifiers D49 and D51 in the Web Memory 520 perform a similar function for the capacitor C53.

The reset pulse applied by way of lead 421 to capacitors C45 and C51, however biases the base circuit of normally conducting transistors T47 and T53 in a positive direction so that each cuts off for the duration of the reset pulse on lead 421. During the time transistors T47 and T53 are conducting, diodes D47 and D53 respectively are of course reverse biased and do not conduct, since capacitors C47 and C53 are always more negative than +20 volts. When transistors T47 and T53 cut off, the collector circuits of T47 and T53 swing towards −20 volts so that current flows through resistors R47 and R53 and diodes D47 and D53 respectively to charge the capacitors C47 and C53 respectively in a negative direction. The ultimate value of the charge acquired by capacitor C47 is determined by the voltage drop across resistors R47 and R43 and that acquired by capacitor C53 is determined by the voltage drop across R53 and R49. The resistance values of R53 and R49 are calculated to enable condensers C47 and C53 to charge to a value of about −14 volts in accordance with the waveform shown at E and F respectively in FIG. 6.

Thereafter the reset pulse on lead 421 terminates as shown at waveform B in FIG. 6 and transistors T47 and T53 again initiate conduction. Their respective collector circuits now swing positive thereafter to prevent current flow through diodes D47 and D53 respectively, thus placing capacitors C47 and C53 at a predetermined negative value.

The emitter circuits of T43 and T49 are swinging in a positive direction in response to the signal on lead 411 and as soon as they become more positive than −14 volts the capacitors C47 and C53 will start to charge positive through diodes D45 and D51 respectively. Now the rate at which the signal on lead 411 is charging is dependent on the speed of cylinder rotation but between any two positions on the cylinder it will always reach the same value. For any given arc of cylinder rotation, therefore, the capacitors C47 and C53 always will charge to the same positive value regardless of the cylinder speed.

It will also be recalled that the positive pulse on lead 421 was also applied through capacitors C27 and C31 respectively and through respective diodes D27 and D31 to the Cylinder Gate 440 and the Web Gate 460 respectively. The positive going reset pulse is applied to the base circuits of transistors T27 and T31 to cut those transistors off as already mentioned. The collector circuit of each, therefore, swings from +20 volts toward ground and this negative going signal is applied to the base circuit of transistors T29 and T33 respectively so that each conducts.

As the capacitors C47 and C53 in the Cylinder Memory 510 and Web Memory 520 respectively are charging negative to about −14 volts, the transistors T29 and T33 in the Cylinder Gate 440 and Web Gate 460 are each rendered conductive. Simultaneously the negative going signals at the collector circuits of T27 and T31 are applied through resistors R28 and R32 respectively to the respective base circuits of transistors T45 and T51 and each conducts.

The collector circuits of T45 and T51 therefore each swing towards +20 volts and since the respective emitter circuits of T43 and T49 are at a less positive value, diodes D43 and D49 are blocked to current flow.

As the emitter circuits of T43 and T49 follow the linearly rising signal on lead 411, the capacitors C47 and C53 each become more negative than the respective emitter circuits of T43 and T49. Capacitor C47 starts to discharge through diode D45 and resistor R43, while capacitor C53 starts to discharge through the diode D51 and resistor R49 as shown by the waveforms E and F in FIG. 6.

At some time during the linear rise of the signal produced by the photocell CR1, the photocell CR2 will be exposed to a momentary light impulse, while the web registration mark simultaneously will control the light radiation pattern extending between lamp 110 and photocell 115. The result will be a cylinder reference pulse or signal from the photocell CR1 and a web pulse or signal from photocell 115. If they occur simultaneously the web and print cylinder are in synchronization, and no adjustment will be made, but if not correction or accommodation will be provided, as will be explained.

Consider the output of the photocell CR2 which is type 1N2175 having a double anode and whose resistance varies responsive to the light exposure. Its output is fixed with respect to the inspection zone signal due to the physical positioning of the components within assembly 200. Cell CR2 on being abruptly exposed to light from lamp 270 through the aperture 267 in wall 266 causes a negative going voltage signal to be applied to the capacitor C1. The voltage signal is differentiated by the capacitor C1 and the parallel resistance of R1 and the input impedance of transistor T1 mounted on the side plate 258 so that a sharp negative going spike is provided at the base circuit transistor T1. Transistor T1 is connected as an emitter follower and its output is a duplication of the negative going spike transmitted as shown by waveform E in FIG. 7 at a much lower impedance level. This output is transmitted by way of the lead 302 to the Cylinder Pulse Shaper 430.

The signal applied to lead 302 is extended through capacitor C2 to the base circuit of transistor T5 in the Cylinder Pulse Shaper 430 and that transistor initiates conduction. The diode D3 is connected between the base circuit of transistor T3 and +20 volts to maintain the base line of the signal at about +20 volts after it passes the capacitor C2 so that transistor T5 conducts when the signal drops by a small fixed voltage without appreciably being affected by the speed or the D.C. level of the signal. As the input signal is large enough to overdrive transistor T5, its output is a square wave as shown by waveform F in FIG. 7. This square wave is differentiated by the capacitor C5 and resistor R5 and applied to the base circuit of transistor T7 to cut that transistor off. This gives rise to a negative going pulse at the collector circuit of transistor T7 as shown by waveform G in FIG. 7 and this pulse is differentiated by capacitor C7 and the resistors R6 and R7. The differentiated pulse is further amplified by transistor T9 to provide a sharp positive going pulse at its collector circuit. This is shown by the waveform C in FIG. 6, the waveform H in FIG. 7 and waveform C in FIG. 8. This pulse is substantially independent of the shape, amplitude and repetition rate of the input signal.

The positive going spike in the collector circuit of transistor T9 is applied by way of lead 431 through capacitor C9 and the diode D9 to the base circuit of transistor T29 in the Cylinder Gate 440 to cause that transistor to terminate conduction. The collector of T29 therefore swings negative and a corresponding pulse is applied to the base circuit of transistor T27 to turn it on. This negative pulse is also applied by way of lead 442 to the base circuit of transistor T35 in the Fail Safe Gate 470. The operation of the Fail Safe Gate 470 subsequently will be discussed. In the meantime, of course, the collector circuit of transistor T27 swings positive and this positive pulse is applied to the base circuit of transistor T45 in the Cylinder Memory 510. The D.C. level of this positive pulse is stepped up by the +40 volts connected to resistors R29 and R28, but the amplitude of the pulse is lowered by those resistors as shown by the waveform J in FIG. 7 wherein both the actual amplitude and the open circuit voltage without resistor R29 are indicated.

The transistor T45 now terminates conduction and as its collector circuit swings negative towards −20 volts, this signal is transmitted through diode D43 to block diode D45 and thereby prevent further discharge of capacitor C47.

The web registration mark is detected by the interruption of the normal light radiation pattern between lamp 110 and photocell 115 which is exposed to the light from lamp 110 through an appropriate slit. The photocell 115 responds by providing a negative going signal to the grid of the tube V1 in the Web Scanner Amplifier 350. Potentiometer P2 of course serves to adjust the bias and sensitivity level of the tube V1. If the web and cylinder are synchronized this signal appears simultaneously with the signal output of CR2. Tube V1 amplifies and inverts the input signal to provide a positive going signal at its plate, which is applied to the grid of tube V2.

Tube V2 is connected as a cathode follower through the adjustable resistor R2, provided for signal sensitivity and level control, and it transmits a positive going signal by way of lead 305 to transistor T11 in the Web Signal Shaper 450. This signal may be transmitted over a considerable length of line without undue deterioration since the output of V2 is at the same voltage level as its input but at a much lower impedance level.

At this point it will be noted that the adjustment of R2 permits compensation for different web and mark conditions. Thus the signal response of cell 115 depends on the difference in response to light between the web and the registration mark and as different webs and their respective registration marks are of differing colors, intensities and hues compensation therefor must be provided. In view of the just discussed web and mark factors, it should be appreciated that the scanner arrangement described may respond to signals of opposite character to that described. Thus if the web is dark and the registration mark light, the character of the signals derived from cell 115 and tubes V1 and V2 will be opposite to that described and a negative pulse is transmitted over lead 303.

Transistor T11 is an NPN type transistor and conducts responsive to a positive signal pulse from lead 303, capacitor C11 and resistor R12. If negative signals are to be received, transistor T11 will be by-passed on operation of switch S1 as will be explained, but the results produced by the Shaper 450 will be the same irrespective of the type of pulse provided from lead 303.

As transistor T11 conducts responsive to a positive signal on lead 303, a negative going amplified voltage is provided at its collector circuit and that voltage is applied to the base circuit of transistor T13 to render transistor T13 conductive. Transistor T13 is normally cut off by the bias voltage applied through R14 and R13. The signal appearing at the collector circuit of T13 is similar in shape to waveform F in FIG. 7. The collector circuit of transistor T13 therefore swings towards +20 volts, when it comes on and this positive going signal is applied to the base circuit of transistor T15 which immediately terminates conduction, and its collector circuit therefore swings towards ground potential.

As the collector circuit of transistor T15 swings in a negative direction, transistor T17 conducts to provide a positive signal at its collector circuit. That signal is transmitted by way of lead 451, the capacitor C17 and the diode D17 to the base circuit transistor T33 in the Web Gate 460 to terminate conduction of transistor T33. It will be seen from the arrangement of transistors T15 and T17 that the output from the Web Pulse Shaper 450 is essentially similar to that from Cylinder Pulse Shaper 430. This is shown by waveform D in FIG. 6, waveform H in FIG. 7 and waveform D in FIG. 8, and that it is utilized in a similar manner to the output of Shaper 430.

At the collector circuit of transistor T33 then swings toward ground, a negative going signal is applied to the base circuit of transistor T31 and that transistor again initiates conduction in a manner similar to that described for transistors T29 and T27 in the Cylinder Gate 440.

As the collector circuit of T31 swings positive, a pulse is transmitted from Gate 460 through the divider comprising resistors R32 and R33 and by way of lead 461 to the Web Memory 520. This pulse is similar to waveform J in FIG. 7 and is applied for turning off transistor T51 in the Web Memory 520. As the emitter circuit of T49 now swings negative, conduction through diode D51 is terminated. Capacitor C53 therefore stops further discharge in a manner explained for capacitor C47 in the Cylinder Memory 510, and the results of this will be explained.

Now returning for a moment to the Web Pulse Shaper 450, it will be recalled that this shaper could be arranged to operate from either positive or negative input signals on lead 303. To do this the switch S1 is provided and in the position shown, it connects ground to the emitter circuit of T11, and +20 volts to the diode D11, which is biased by +40 volts applied to one side of the voltage divider comprising R13 and R14. In addition switch S1 connects −20 volts to the other side of diode D11 through resistors R11 and R12. With this arrangement the junction of resistors R12 and R13 is at about +20 volts, while the base circuit of T11 is somewhat more negative so that it is biased to cut off. It will conduct responsive to a positive signal, on lead 303, which raises the voltage level at the junction of resistors R11 and R12. Diode D11 therefore will bypass from transistor T11 any negative going signal appearing on lead 303, while positive swings are limited to +40 volts connected in the reverse direction through diode D14. This protects transistor T11 from excessive base voltage swings and prevents large signals from overriding the signal in the path from the collector of T11 to the base of T13.

To provide the required flexibility which enables Shaper 450 to respond to different web and registration mark conditions, giving rise to a negative signal on lead 303, switch S1 is operated from the position shown. This disconnects −20 volts from resistor R11 and ground from the emitter of T11 and instead connects +20 volts to the emitter of T11 through resistor R10 to maintain T11 off at all times. The +20 volts also is disconnected from diode D11 and instead connected in the reverse direction to diode D13. Transistor T13 is biased in the non-conducting condition by the −20 volts and +40 volts applied to opposite ends of the voltage divider comprising resistors R15, R11, R12, R13 and R14. This leaves the junction of R12 and R13 at a potential of about +20 volts and the base circuit of T13 more positive.

A negative going web signal on lead 303 is applied to the base circuit of T13 through resistor R13 to initiate conduction in T13 and it will produce a positive signal in its output circuit. The operation of transistors T15 and T17 thereafter is as described and T17 provides a signal on lead 451 of a character similar to that provided on lead 431. It will also be mentioned that positive going signals if now applied to lead 303 are bypassed to +20 volts by diode D13 while negative going signals are clipped at ground by diode D12.

Reiterating for clarity, transistors T29 and T33 are each rendered non-conductive in response to the respective positive pulses applied from leads 431 and 451 and the collector circuit voltage of each swings negative. This voltage renders transistors T27 and T31 conductive respectively and a positive pulse is applied to leads 441 and 461 respectively for rendering respective transistors T45 and T51 non-conductive. The respective diodes D45 and D51 therefore are clamped to prevent capacitors C47 and C53 respectively from discharging further in a positive direction as explained and as may be seen from waveform K in FIG. 7 representing the various voltage levels at the emitter of transistor T43. A similar situation to that occurring at the emitter of transistor T43 occurs at the emitter of transistor T49. The level at which rectifiers D45 and D51 clamp the voltage at capacitors C47 and C53 respectively is determined by the voltage level attained by the inspection zone signal at the emitter of transistors T43 and T49, in the Cylinder Memory 510 and the Web Memory 520, respectively, at the instant when transistors T45 and T51 are rendered non-conductive by the respective signals on leads 441 and 461 initiating from the cylinder pulse and web pulse respectively. Upon the occurrence of the pulses transmitted to transistors T45 and T51 through the respective leads 441 and 461 these transistors are rendered non-conductive.

This causes the emitter voltage from transistors T43 and T49 to drop abruptly to a negative value, by virtue of their connection through resistors R45 and R48 and diodes D43 and D49 to −20 volts. This abrupt drop in the emitter voltages, as compared with the voltage in capacitors C47 and C53, renders diodes D45 and D51 non-conductive and thus terminates the discharge of capacitors C47 and C53. This voltage level will be maintained on the diodes D45 and D51 until the arrival of the next reset pulse so that for the remainder of the cylinder revolution capacitors C45 and C51 remain at the particular level to which they are charged as shown by waveforms E and F in FIG. 6. The effect is to leave the capacitors C47 and C53 at the respective voltage levels corresponding to that reached by the inspection zone signal at the time the respective cylinder pulse and web pulse arrive at the respective memories 510 and 520.

It will therefore be understood that capacitors C47 and C53 each independently discharges from a predetermined potential and at the same rate, after the reset pulse.

Thus the linearly rising signal on lead 411 is swinging the emitter circuits of T43 and T49 more positive at a substantially constant or linear rate especially over an arc of cylinder travel in which the cylinder and web pulses should normally occur. The rate will depend on cylinder speed but for any given spacing between respective points on the web or cylinder the particular charge acquired by respective capacitors C47 and C53 at the time each is clamped by the respective cylinder and scanner pulse is a function of the spatial relationship between the cylinder and web pulses. When the inspection zone signal on lead 411 subsequently starts to assume a more negative value in response to the decreasing area of exposure of cell CR1, the emitter circuits of T43 and T49 will follow that negative swing to reverse bias diodes D45 and D51 respectively if they have not previously been reverse biased by the action of transistors T45 and T51. Each capacitor discharges in a positive direction from a potential of about −14 or −15 volts towards some positive value dependent on the potential at the emitter circuit of transistors T43 and T49 respectively. As the cylinder reference pulse occurs at a fixed position relative the inspection zone and reset signals due to the location of the aperture 267 with respect to aperture 286, the capacitor C47 will have its discharge process interrupted at the same position in each cylinder revolution as shown in waveform C and E in FIG. 6.

This will normally occur after the print cylinder 150 has rotated through, for example, 10° from the start of the inspection zone signal. The web signal is subject to considerable variation with respect to the inspection zone and reset signals and therefore may occur at any time during the cylinder revolution depending on the synchronization of the web registration mark with respect to the print cylinder 150.

Thus assuming the web registration mark is properly synchronized and it provides the web signal simultaneously with the occurrence of the cylinder pulse, both capacitors C47 and C53 are simultaneously clamped at the same voltage. This voltage is dependent on the distance travelled by the print cylinder 150 and web 30 from the initiation of the reset pulse on lead 421 and the subsequent cylinder and web pulses. Capacitors C47 and C53 therefore, each will be at, for example, ground potential, if both pulses arrive when the cylinder has rotated through exactly 10° from the start of the inspection zone signal as shown by the portions of waveforms E and F relating to the first cylinder revolution shown in FIG. 6.

During the second cylinder revolution shown in FIG. 6 arrival of the web pulse is illustrated as occurring after the cylinder has rotated an additional 2° from the occurrence of the cylinder pulse. As the capacitor C53 will therefore have continued its discharge after capacitor C47 had been clamped by the cylinder pulse, capacitor C53 will be more positive than capacitor C47 by an amount related to the dimensional mismatch between the cylinder pulse and the web pulse. In the group of waveforms shown in FIG. 6 illustrating occurrences during the third revolution, the web pulse occurs before the cylinder pulse and therefore capacitor C53 will not charge positive as far as capacitor C47. Capacitor C53 therefore will be at a more negative value than capacitor C47 at the time capacitor C47 is clamped by the cylinder pulse.

In either event capacitor C47 biases lead 511 in accordance with the potential at which it is clamped while capacitor C53 biases lead 521 in accordance with the potential at which it is clamped, and each capacitor remains at that potential until the arrival of the succeeding reset pulse, which recharges the capacitors to the predetermined negative values described.

This bias is applied over leads 511 and 521 respectively to the grids of tubes V5 and V6 and any difference between their levels is called the error signal. Since it is desirable that this bias or signal should not be permitted to leak away especially at low press speeds, the tubes V5 and V6 are vacuum tube cathode followers and therefore provide extremely high impedance. Capacitors C55 and C59 are connected in shunt with the respective cathode resistors R55 and R59 for the purpose of providing a smooth response to the setting of capacitors C47 and C53 by the rest pulse on lead 421.

In addition there are indicated means for biasing the tube V6 by means of the power supply at 533 and the potentiometer P5. This arrangement permits precise small adjustments to be made in the Amplifier 530 to achieve desired synchronization between positions of the previously applied printing or registration on the web and that indicia to be applied by cylinder 150. By the addition of a particular D.C. voltage to one channel of the differential amplifier 530 the level of operation of that channel is adjusted with respect to the other and provides the equivalent of moving the web with respect to the cylinder or vice-versa. As may be visualized, changing the bias on one of the tubes V5 or V6 by moving the arm of P5, accomplishes the same objective as mechanically moving the reference point at which either the cylinder or web signals are generated. The arm of potentiometer P5 therefore may be moved in either direction and if moved in one direction applies a positive bias to tube V6, and if moved in another direction applies a negative bias to tube V6. If permitted to remain in its center position, as shown, no voltage is developed between the arm and the cathode of V6 so that tube V6 is biased at the same value as tube V5. Alternatively a D.C. bias is added to the inspection zone signal when applied to either one or the other of the two capacitors C47 and C53 for the setting of the voltage level of either capacitor or the capacitors are otherwise controlled to create a variation in the voltage level of either capacitor as desired. These types of electrical biasing provide a very versatile arrangement for adjusting the position of the color to be applied to the previously registered print in either direction by a desired amount.

Transistors T55, T57, T59 and T61 form a conventional D.C. coupled differential amplifier arrangement with transistors T55 and T57 forming one channel or path and T59 and T61 the other channel or path. This amplifier drives the hydraulic servo mechanism 80 comprising the control solenoids 535 and 536 respectively. The solenoids are connected by means of leads 531 and 532 respectively across the output of transistors T57 and T61. The coils 575 and 580 in turn control valves which permit the piston in chamber 75 to be driven in either direction for moving the web compensating apparatus 50 in one direction or the other and thereby adjust the position of the web 30 with respect to the print cylinder 150.

The solenoids 535 and 536 form a balanced push-pull collector load for the output of transistors T57 and T61.

The emitter circuits of transistors T57 and T61 are connected through the large resistor R60 to the +130 volt supply feeding the plate circuit of the tubes V5 and V6, while transistors T55 and T59 are connected to that supply through the large resistor T56.

A very unusual control system is incorporated in the Differential Amplifier 530 by the use of the adjustable resistors R57 and R61, which provide feed-back paths from the collector circuit of T57 to the base circuit of T59 and from the collector circuit of T61 to the base circuit of T55 respectively.

Resistors R57 and R61 are each adjustable to control the sensitivity of the amplifier 530 and stabilize the gain for any given setting. This provides means for adjusting the internal gain and therefore the degree of response of the amplifier 530 for any given input to compensate for various press conditions such as different cylinder sizes and compensator gear ratios. Use of the resistors R57 and R61 provides a certain degree of damping to ensure that operation of mechanism 80 does not occur on a transient signal.

It will be appreciated that from the time the capacitors C47 and C53 initially are set by the reset pulse as explained, their discharge continues at a substantially equal rate so that the path in the differential amplifier formed by the transistors T55 and T57 is controlled in the same manner as the path formed by transistors T59 and T61 to provide a substantially stable balanced output to the solenoids 535 and 536 in the hydraulic servo-mechanism 80. The hydraulic valves therefore remain uncommitted to any action.

The moment one of the condensers C47, for example, is clamped, as the result of the arrival of the cylinder reference pulse as explained, while the capacitor C53 continues to discharge as shown for the second cylinder revolution in FIG. 6, there is an error signal produced at the Differential Amplifier 530. The gain provided by one path in the amplifier 550 will immediately begin to increase over that in the other path. The current through the solenoids 535 and 536 therefore becomes unbalanced and the servo-mechanism 80 is controlled accordingly. Oil will flow through the chamber 75 to drive the piston therein in the appropriate direction and adjust the position of roll 70 and web 30.

The rate at which this adjustment of roll 70 and web 30 occurs is determined by the error signal. Thus the servo-mechanism 80 passes an amount of oil into the chamber 75, which amount is proportional to the difference in energization between coils 535 and 536 and therefore is proportional to the error.

This avoids a problem present in previous synchronization systems. In previous systems the hydraulic motor is run at a fixed speed for a length of time which is proportional to the error and as speed or acceleration of the various components was unknown adjustment was always in process.

The arrival of the web pulse clamps capacitor C53 at a particular potential shown at wave form F in the second cylinder revolution illustrated in FIG. 16. As that potential is more positive than the potential at capacitor C47, the gain through the path comprising transistors T59 and T61 exceeds the gain in the other path by a constant amount for the remainder of the revolution and until the next reset pulse arrives. Because of this the servo-mechanism 80 remains as operated by the solenoids 535 and 536 at a corresponding rate for the remainder of the cycle. The degree of unbalance will be constant for the remainder of the cycle as shown by wave form G in FIG. 6 and is determined by the amount of error. It may thus be seen that the amount of oil passed through the valves is proportional to the mismatch between the cylinder pulse and the web pulse and therefore is proportional to misalignment between the web and print cylinder. Since the system reads the error only once per revolution, the adjustment remains constant after both the cylinder and web pulses are received and during the remainder of the revolution as shown by waveform G in FIG. 6.

If as in the succeeding revolution illustrated in FIG. 6 the error has changed as shown by the arrival of the web pulse before the cylinder pulse, the piston in chamber 75 is operated at a speed proportional to the new error. The capacitor C53 in this case is clamped at a value more negative than capacitor C47. The output to the coils 535 and 536 is reversed from that previously illustrated and the roll 70 and web 30 moved in a direction opposite that which obtained when the web pulse succeeded the cylinder pulse.

The system also provides certain guard apparatus to indicate extreme malfunctioning of the apparatus. This includes the Fail Safe Gate 470 and the Fail Safe Relay 540 for detecting the loss of either the cylinder or web signals or pulses. Thus if either of the above signals fails to appear, a false indication of a large error will result due to the failure of the Amplifier 530 to receive the necessary signals from the respective Memories 510 and 520. The system would then make a false correction in one direction or the other depending on which signal failed to appear and result in spoilage of the printed copy. It may also eventually result in operating the compensator 50 to a limit. The fail safe arrangement provides for a return of the system to manual control in the event of the failure of either of these signals to appear so that the reason for this may be more easily investigated.

It will be recalled that a reset pulse on lead 421 was applied to the base circuit of transistor T39 and that transistor was rendered non-conductive. The collector circuit of transistor T39 swings negative as shown the first pulse in waveform J illustrated in FIG. 8. Transistor T41 therefore conducts, as the negative swing in the collector of T39 is applied to the base of T41. The reset pulse on lead 421 it will be recalled, also switched the transistors T29 in the Cylinder Gate 440 and T33 the Web Gate 460 respectively as shown by waveform E and F in FIG. 8 so that the transistors T29 and T33 are conducting.

The positive signal maintained by the collector circuit of transistors T29 and T33 on leads 442 and 462 respectively and applied through resistors R36 and R37 respectively places transistor T35 in the "off" condition and its collector circuit swings negative as shown by the first pulse in waveform G in FIG. 8. It will be noted that transistor T35 will become non-conductive, if either lead 442 or 462 is positive due to the resistance values chosen for R35, R36 and R37 and the voltages connected thereto. When transistor T35 is rendered non-conductive, one input to the base circuit of transistor T37 swings in a negative direction towards ground potential. The inspection zone signal is coupled to the base circuit of transistor T37 from the collector circuit of T21 and this positive signal is maintained on the base circuit of transistor T37 through resistor R39. The resitsors R38, R39 and R40 form an arrangement somewhat similar to resistors R35, R36 and R37, but they are arranged so that transistor T37 initiates conduction when the input through resistor R38 swings negative or towards ground potential as transistor T35 becomes non-conductive. Thus transistor T37 is normally conducting at the beginning of the cycle.

Upon arrival of the cylinder pulse, transistor T29 is rendered non-conductive as explained, and its collector voltage swings towards ground potential, but transistor T35 does not become conductive until both of its input leads 442 and 462 swing negative or towards ground potential. Therefore transistor T37 cannot become non-conductive until the web pulse arrives to render T33 non-conductive. Then the collector circuit of T35 swings positive as it starts to conduct in response to both transistors T29 and T33 becoming non-conductive. Its collector circuit swings to +20 volts as shown by waveform G in FIG. 8.

Transistor T37 therefore terminates conduction as the inputs through both resistors R38 and R39 are now positive. A negative going voltage therefore appears at the collector of transistor T37 as shown by the first pulse in waveform H illustrated in FIG. 8. This negative voltage swing is blocked by diode D37. Thus before Transistor T37 is cut off the inspection zone signal and the cylinder and web pulses must be received as shown by the waveforms connected with the first cylinder revolution illustrated in FIG. 8. If either input to transistor T37 remains negative, transistor T37 remains conducting as shown by the straight line encompassing the second, third and fourth cylinder revolutions illustrated in waveform H in FIG. 8.

Assuming now that the cylinder and web pulse are received before the inspection zone signal ends, the transistor T37 is cut off as already explained. Subsequently when the inspection zone signal ends, the input to resistor R39 changes from positive to negative and T37 again begins to conduct as shown by the cessation of the pulse in waveform H. It is this trailing edge of the inspection zone signal swinging negative that causes the collector of T37 to again go positive and transmit a positive signal over capacitor C37 and diode D37 to the base circuit of transistor T41.

Transistor T41 therefore terminates conduction and transistor T39 is rendered conductive so that the collector circuit of transistor T39 goes positive to bias lead 471 accordingly. This positive bias does not affect the condition of transistor T28 in the Fail Safe Relay 540. It will be noted that negative swing applied to lead 471 while transistor T39 is non-conductive during each cylinder revolution is applied through the filtering circuit comprising resistors R63, R64 and the capacitor C63. This prevents negative signals of other than a predetermined duration from affecting the transistor T63. The transistor T63 therefore is prevented from becoming conductive during slow press speeds.

The collector circuit of transistor T41 will swing positive on the next reset pulse on lead 421 to render transistor T39 non-conductive, but the negative swing in the collector circuit of T39 is of such short duraiton that it cannot render transistor T63 conductive before the inspection zone signal terminates to again reverse the condition of transistor T39 during normal operation.

If either of the aforementioned cylinder or web signals fails to occur, transistor T35 will not change its condition and therefore transistor T37 will remain conductive throughout the entire inspection zone signal. Thus, assuming as shown during the second cycle or cylinder revolution illustrated in FIG. 8, that the cylinder reference pulse does not occur, transistor T35 does not conduct as shown by waveform G. Transistor T37 therefore fails to become non-conductive during that revolution as shown by waveform H. The collector circuit of T37 remains negative for the entire revolution and capacitor C63 charges negative from the collector potential of T39 to initiate conduction in transistor T63. The collector circuit of T63 becomes more positive as shown by waveform K in FIG. 8 to render transistor T65 non-conductive about midway in the rise of the voltage swing at the collector of T63 as shown by waveform L in FIG. 8. Relay 545 is therefore de-energized to switch its armature from contact 547 to contact 549. This energizes a relay (not shown) which switches the coils 535 and 536 from the differential amplifier 530 to a bridge circuit (not shown) and enables manual control of the press all in any well known manner.

In the third cylinder revolution illustrated in FIG. 8 the scanner pulse is received after termination of the inspection zone signal. It will be seen that T35 switches on as the inputs to both leads 442 and 462 go negative, but since the input on lead 432 has already reverted to a negative value, transistor T37 cannot be cut off and this leaves lead 471 negative to initiate conduction in T63 and de-energization of relay 545 as explained.

In the fourth cylinder revolution illustrated in FIG. 8 the web pulse either does not occur or is not received; however, transistor T35 is rendered non-conductive, as explained, responsive to the reset pulse. As transistor T35 thereafter fails to become conductive, transistor T37 remains conductive, and lead 471 assumes a negative potential for a sufficient duration to change capacitor C63 and turn transistor T63 on for de-energizing relay 545. This provides already described results for switching the press to manual control.

The subject matter described herein has illustrated one arrangement for securing automatic synchronism between several components moving relative to one another based on their spatial displacement from a normal position, together with certain apparatus for enabling synchronization under different conditions and for safeguarding or detecting malfunctions; however the invention is believed to illustrate principles of broad novelty which are hereinafter more fully set forth in the appended claims.

I claim:

1. A synchronization system comprising means for deriving a first signal varying at a substantially linear rate corresponding to the velocity of relative movement between a first object and a second object and between two points each having a known relationship to said first object, means for deriving a second signal responsive to the relative movement of said first object, means for deriving a third signal responsive to a position on said second object, having a predetermined relationship to a position detecting arrangement, and means for comparing said second and third signal with said linearly varying first signal whereby the spatial relationship between said first and second objects is characterized by the variance in the first signal between its comparison with said second signal and its comparison with said third signal.

2. The arrangement claimed in claim 1 in which the amplitude of said first signal varies substantially linearly.

3. Apparatus for synchronizing the movements of a first and a second object which comprises, means for generating a linearly varying signal in response to the movement of said first object, means for deriving a first position indicating signal in correspondence with the position of a first index point on said first object, means for deriving a second position indicating signal in correspondence with the position of a second index point on said second object, and controlled measuring means proportionately responsive to said linearly varging signal for measuring the displacement between said first and second index points, said measuring means being responsive to the occurrence of said first and second position indicating signals for measuring the variation of said linearly varying signal during the interval between the occurrence of said first and second position indicating signals.

4. The system claimed in claim 3 in which said controlled means comprises a pair of elements each set to a predetermined condition responsive to the initiation of said linearly varying signal and thereafter varying simultaneously in the same direction in accordance with the variation in said linearly varying signal.

5. The system claimed in claim 4 in which said elements each comprise a capacitor charged to a predetermined level on initiation of said linearly varying signal.

6. The system claimed in claim 3 in which said means for generating said linearly varying signal comprises a light responsive element exposed to light between two positions of said first object.

7. The system claimed in claim 6 in which the quantity of light to which said light responsive element is exposed varies at a substantially linear rate corresponding to the velocity of said first object.

8. In the system claimed in claim 6 means for improving the linear characteristics of the signal derived from said light responsive element in accordance with the speed of said first object.

9. The system claimed in claim 3 in which said controlled means comprises a pair of capacitative elements, means for initially charging the capacitative elements of said pair to a predetermined value responsive to the initiation of said signal from said responsive element, and means for thereafter controlling the charge on each capacitative element to vary at a rate substantially identical to said linearly varying signal.

10. The system claimed in claim 9 in which said initial charging means comprises switch means momentarily operated responsive to the initiation of said linearly varying signal.

11. In the system claimed in claim 10 in which said switch means comprises a semi-conductor element having a unidirectional circuit connection to one of said capacitative elements.

12. The system claimed in claim 9 in which said charge varying means comprises a transistor arranged as an emitter follower, and a unidirectional circuit connection to one of said capacitative elements.

13. In the system claimed in claim 9 a pair of switches, means for operating one switch of said pair responsive to said one signal and the other switch of said pair responsive to the other signal for terminating further variation in the charge of a respective capacitative element irrespective of the variation in said linearly varying signal.

14. The system claimed in claim 13 in which each switch of said pair comprises a semi-conductor device.

15. In the system claimed in claim 9 a differential amplifier connected to said capacitative elements, and means controlled by said amplifier to vary the relative position of one of said objects responsive to a difference in the charge on one of said capacitative elements.

16. In the system claimed in claim 15 means for biasing said differential amplifier to control the effect thereon of a difference in the charge on one of the capacitative elements of said pair.

17. A print registration system for use with a moving web upon which an index marked on the web by engagement with a moving print cylinder and in which a web marking is detected to provide a web signal, the improvement comprising a light responsive device, a scanning element operated for exposing said device to a linearly varying light quantity during a predetermined portion of the movement of said print cylinder whereby said device provides an output signal which varies at a rate that is substantially linear with respect to the speed of movement of said cylinder, means thereafter controlled by said output signal and successively placed in any one of a plurality of different conditions at a rate corresponding to the linear variation rate of said output signal, means deriving a predetermined signal at a particular position with respect to said linear signal, and means operated responsive to said web signal and said predetermined signal for determining the change in condition of said controlled means during the interval occurring between said web signal and said predetermined signal to determine the spatial relationship between said web and said print cylinder.

18. In the system claimed in claim 17 means for adjusting the position of said linearly varying signal with respect to said cylinder.

19. In the system claimed in claim 17 means for adjusting the position of said predetermined signal with respect to said linearly varying output signal.

20. In the system claimed in claim 17 wherein said web signal results from a mark on said web said mark having one light value and being detected by a light responsive device on a web having another light value, the improvement comprising means operable for providing a signal having a predetermined characteristic responsive to the detection of said mark by said last named light responsive means, and means for controlling said operable means to provide a signal having said predetermined characteristic responsive to said device detecting a mark having said one light value on a web having said other light value.

21. In the system claimed in claim 20, means for determining whether said web signal or said predetermined signal is first provided for operating said adjusting means in a respective direction.

22. A print registration system for use with a moving web upon which indicia is registered by a movable print cylinder and in which a signal is provided to indicate the position of a mark on said web, the improvement comprising a scanning element for providing a signal rising linearly in amplitude at a rate corresponding to speed of said cylinder and during a predetermined portion of the movement of said print cylinder, means for providing another signal at a predetermined point in the revolution of said cylinder, a pair of capacitors one of which is associated with said cylinder and one of which is associated with said web and each set to a predetermined charge responsive to the initiation of said linearly rising signal and thereafter controlled to acquire another charge at a rate controlled by the rate of said linearly varying signal, and means for terminating the charging of the respective capacitors responsive to the web mark position signal and said other signal respectively whereby the relationship between said web and said print cylinder is ascertained by the charge difference between said capacitors.

23. In a synchronizing system for use in a print line wherein a moving web has indicia thereon which is detected for providing a web signal indicative of the position of said indicia and therein said web is engaged by a print cylinder for registering indicia on said web in a predetermined relationship to said position, the improvement comprising means operated in conjunction with said cylinder for generating a signal varying substantially linearly with the operation of said cylinder, means for generating a cylinder signal corresponding to a fixed position on said cylinder and at a predetermined point with respect to said linearly varying signal, a pair of signal generating elements one of which is associated with said cylinder with said web signal, means operated by said linearly varying signal for initiating the operation of said signal generating elements and for controlling said elements to generate linear signals each varying in correspondence with said varying signal, means operated by either said cylinder signal or said web signal for terminating operation of the respective signal generating elements, and means controlled by the signal generated by one of said signal generating elements after operation of the other generating element is terminated for adjusting the relative position of said web and cylinder in accordance with the signal thereafter generated by said one element.

24. For use in a synchronization system to determine the spatial relationship of two objects moving relative to one another comprising means for generating a signal varying at a substantially linear rate in response to the movement of one object and at a rate corresponding to the velocity of said one object, an arrangement for deriving a momentary signal on initiation of said linearly varying signal, a pair of capacitative elements, a switch arrangement momentarily operated by said momentary signal for charging each of said capacitative elements to a predetermined value, and a valve arrangement controlled in accordance with the variation in said linearly varying signal to control the charge at said capacitative elements to follow the displacement of said one object with respect to the other one of said two objects so that the charge appearing at each capacitative element is indicative of the spatial position of said one object irrespective of its velocity.

25. In the arrangement claimed in claim 24, means for deriving one signal corresponding to one position on said one object, means for deriving another signal corresponding to one position on said second object, and means for applying the respective position signals to respective ones of said capacitative elements for terminating further change in the charge at the respective element whereby the spatial relationship between the other one of said two objects is represented by the charge difference between said respective capacitative elements.

26. In a synchronizing system for use in a print registration system wherein a moving web has indicia thereon which is detected for providing a web signal indicative of the position of said indicia, and wherein said web is engaged by a print cylinder having means associated therewith for generating a cylinder signal corresponding to a particular point on said cylinder and for registering indicia on said web in a predetermined relationship to said position, the improvement comprising means operated for generating a signal varying linearly with the velocity of either said web or said cylinder, a pair of signal generating elements one of which is associated with said cylinder signal and the other of which is associated with said web signal, means operated by said linearly varying signal for initiating the operation of said signal generating elements and for controlling said elements to generate linear signals varying in amplitude at a rate corresponding with the velocity of either said web or said cylinder, and means operated by either said cylinder signal or said web signal for terminating operation of the respective signal generating element whereby any signal thereafter generated by one of said elements represents the misalignment between said web and cylinder from said predetermined relationship.

27. In the system claimed in claim 19, means operated by a signal thereafter generated by said one element for establishing said predetermined relationship.

28. The system claimed in claim 27 in which said establishing means comprises a differential amplifier having a pair of amplifying channels each connected to a respective one of said elements to receive a respective signal therefrom.

29. In the system claimed in claim 28, means for biasing one of said channels to establish a responsive level therein different from that of the other channel.

30. In the system claimed in claim 28, means for damping the response of each channel to prevent oscillatory operation of said establishing means.

31. In the system claimed in claim 28, an adjustable feedback element connected between each channel for controlling the sensitivity thereof.

32. In the system claimed in claim 26, control means operated responsive to the appearance of said linearly varying signal, and means operated by said control means responsive to the failure of either said web or cylinder signals to appear within a predetermined portion of said linearly varying signal for indicating said failure.

33. In the system claimed in claim 32, means operated at a predetermined point on said linearly varying signal and by said linearly varying signal for resetting said control means to an unoperated condition.

34. In the system claimed in claim 26, means for adjusting the relationship between said cylinder signal and said linearly varying signal.

35. The system claimed in claim 26 in which the means for generating said linearly varying signal comprises a light responsive device, and means mounted for operation with said print cylinder for controlling the exposure of said device to light at a substantially linearly varying rate and at a velocity dependent on the velocity of said print cylinder.

36. In the system claimed in claim 35, means for selecting the portion of the print cylinder operation in which the exposure of said device is linearly controlled.

37. In the system claimed in claim 35, another light responsive device, means mounted coaxially with said print cylinder for controlling the exposure of said other device to a particular light value at a selected point with respect to the control of said first light responsive device for generating said cylinder signal.

38. For use in ascertaining the relative position of a rotatable print cylinder and a moving web upon which indicia are registered by said rotatable print cylinder, the improvement comprising a scanning element operated in synchronism with said print cylinder, and a light responsive device exposed to light under control of said scanning element, the configuration of said device arranged to control the exposure at a substantially linearly varying rate with the rate dependent on the speed of operation of said cylinder and element, whereby said device produces a signal varying linearly at a rate dependent on the speed of said element, electronic valve means arranged to amplify said signal to produce another signal having an amplitude which varies linearly as a function of the speed of operation of said cylinder, said valve means being operative to generate a pulse of comparatively short duration in response to initiation of the signal produced by said light responsive device, a pair of elements each set to a respective condition responsive to said valve means generated pulse, and in combination therewith a second electronic valve means arranged to be gated in accordance with the amplitude of said amplitude varied signal for thereafter progressively changing the condition of said set elements accordingly, another light responsive device, another scanning element operated in synchronism with said cylinder controlling the exposure of said other device to light during a predetermined portion of said linearly varying exposure to derive a cylinder pulse.

39. In the arrangement claimed in claim 38, means controlled by said cylinder pulse thereafter preventing a change in condition of one of said elements by said other electronic valve means.

40. In the arrangement claimed in claim 39, means for deriving a web pulse responsive to a mark provided on said web, and means controlled by said web pulse for thereafter preventing a change in condition of one of said elements by said other electronic valve means whereby the relative positions of said web and print cylinder are ascertainable from the difference in condition of said two elements.

41. A system for detecting and measuring errors in register between regularly spaced register marks carried on a moving web of material and a recurrent pattern of work applied to said web by a cyclically operated, work performing member, said system comprising, signal generating means coupled to said work performing member for cyclic operation therewith for deriving first and second electrical signals, said first signal being characterized in recurrence during each cycle of operation of said work performing member and in varying substantially linearly in potential from initiation to termination, and said second signal being an abrupt one and coinciding in occurrence with a preassigned percentage of change in the potential level of said linearly varying first signal, means responsive to the arrival of said register marks at a predetermined point along the path of movement of said web for deriving an abrupt, third electrical signal, differential amplifying means receiving each of said first, second and third signals for determining the sequence of occurrence of time displaced ones of said second and third signals, and for determining the change in potential of said first signal between the occurrence of said last named time displaced second and third signals, whereby said determined potential change and said determined sequence, respectively, provide a dimensional measure of the extent of misregister between an applied one of said patterns and said marks and an indication of the direction of said measured extent.

42. Apparatus as set forth in claim 41 and, in combination therewith, correcting means for altering the space relationship between the pattern recurrently applied to said web and the regularly spaced indicia carried thereby, said correcting means being responsive to said determination of potential change for controlling the magnitude of correction applied for altering the space relationship between said applied pattern and said indicia, said correcting means being further responsive to said potential change determination for controlling the speed of application of said correction, and said correcting means being still further responsive to signals from said differential amplifying means for controlling the direction of application of said correction in correspondence to the sequence of occurrence of said second and third signals.

43. A system for determining the occurrence, direction and magnitude of misregister between regularly spaced indicia carried on a web of moving material and a recurrent pattern of work applied to said web by a rotating member of a machine, said system comprising detecting means disposed at a predetermined location along the path of movement of said web for deriving an abrupt electrical signal in response to the arrival of each of said indicia at said location, second means for generating a second electrical signal, said last named signal being periodic in correspondence with revolutions of said member and increasing substantially linearly from initiation in correspondence with revolution of said rotating member, a third signal generating means for generating an abrupt, third electrical signal indicative of a distinctive rotational positioning of said rotating member, a differential amplfier having first and second amplifying channels, said channels being connected for processing said second signal and being arranged for maintaining the maximum potential level attained by the signal therein independently of the discontinuance of said second signal, connecting means for applying said detecting means signal to said differential amplifier for terminating change in the signal level of one of said channels, next connecting means for applying said third signal to said second electrical channel of said differential amplifier for terminating any change in the potential level in said second channel and means for measuring the difference in potential level of said first and second amplifier channels after application of said second and third terminating signals thereto, whereby there are derived upon each actuation of said third signal generating means, indications of the space displacement of said rotating member from a proper relationship with indicia on said web.

44. Apparatus as set forth in claim 43 wherein said means for generating said second and third electrical signals respectively comprise elements fixed to said rotating member.

45. Apparatus as set forth in claim 43 wherein said second and third signal generating means are housed in common, and respectively comprise second and third coupling elements adjustably mounted in rotational position with respect to said rotating member.

46. Apparatus as set forth in claim 43 and, in combination therewith, correcting means connected for receiving said derived indications and being responsive thereto for correcting the relative positions of said rotating member and said indicia, said correcting means being operable at a speed proportionate to the magnitude of said derived indications.

47. Apparatus as set forth in claim 46 wherein said connecting means is repetitively responsive to successive signals from said indicating means.

References Cited in the file of this patent

UNITED STATES PATENTS

| | | |
|---|---|---|
| 2,230,715 | Cockrell | Feb. 4, 1941 |
| 2,448,292 | Barber | Aug. 31, 1948 |
| 2,628,556 | Fay | Feb. 17, 1953 |
| 2,840,371 | Frommer | June 24, 1958 |
| 2,933,185 | Coleman et al. | Apr. 19, 1960 |
| 2,934,654 | Pakan | Apr. 26, 1960 |